(12) United States Patent
Claessens

(10) Patent No.: US 10,879,685 B2
(45) Date of Patent: Dec. 29, 2020

(54) CABLE SEALING ASSEMBLY FOR AN ENCLOSURE

(71) Applicant: COMMSCOPE CONNECTIVITY BELGIUM BVBA, Kessel-Lo (BE)

(72) Inventor: Bart Mattie Claessens, Hasselt (BE)

(73) Assignee: CommScope Connectivity Belgium BVBA, Kessel-lo (BE)

(*) Notice: Subject to any disclaimer, the term of this patent is extended or adjusted under 35 U.S.C. 154(b) by 0 days.

(21) Appl. No.: 16/345,554

(22) PCT Filed: Oct. 27, 2017

(86) PCT No.: PCT/EP2017/077661
§ 371 (c)(1),
(2) Date: Apr. 26, 2019

(87) PCT Pub. No.: WO2018/078127
PCT Pub. Date: May 3, 2018

(65) Prior Publication Data
US 2019/0319443 A1 Oct. 17, 2019

Related U.S. Application Data

(60) Provisional application No. 62/414,324, filed on Oct. 28, 2016.

(51) Int. Cl.
*H02G 15/04* (2006.01)
*G02B 6/38* (2006.01)
(Continued)

(52) U.S. Cl.
CPC .......... *H02G 15/04* (2013.01); *G02B 6/3897* (2013.01); *G02B 6/4444* (2013.01);
(Continued)

(58) Field of Classification Search
CPC .... H02G 15/04; H02G 15/046; H02G 15/013; H02G 15/32; H02G 3/088; H02G 3/083;
(Continued)

(56) References Cited

U.S. PATENT DOCUMENTS 4,839,471 A 6/1989 Clark et al.
4,880,676 A * 11/1989 Puigcerver ........... H02G 15/013
428/35.7
(Continued)

FOREIGN PATENT DOCUMENTS

DE 42 17 906 A1 12/1993
FR 2 723 162 A1 2/1996
FR 2723162 A1 * 10/1996 ........... H02G 15/013

OTHER PUBLICATIONS

International Search Report and Written Opinion of the International Searching Authority for International Patent Application No. PCT/EP2017/077661 dated Jan. 25, 2018, 11 pages.

*Primary Examiner* — Paresh H Paghadal
(74) *Attorney, Agent, or Firm* — Merchant & Gould P.C.

(57) ABSTRACT

Aspects and techniques of the present disclosure relate to an IP 65 rated enclosure. Cable sealing components in accordance with the present disclosure provide labyrinthine sealing channels around cables of different diameters entering IP 65 rated and other enclosures. In some aspects, the cable sealing components of the present disclosure include a pair of elastomeric sealing blocks having sets of ribs and grooves that intermesh with each other to form sealing cable channels.

15 Claims, 15 Drawing Sheets

(51) Int. Cl.
    *G02B 6/44*      (2006.01)
    *H02G 3/08*      (2006.01)
    *H02G 15/013*    (2006.01)
    *H02G 15/113*    (2006.01)

(52) U.S. Cl.
    CPC ........... *G02B 6/4446* (2013.01); *H02G 3/088* (2013.01); *H02G 15/013* (2013.01); *H02G 3/083* (2013.01); *H02G 15/113* (2013.01)

(58) Field of Classification Search
    CPC ... G02B 6/3897; G02B 6/4444; G02B 6/4446
    See application file for complete search history.

(56) References Cited

U.S. PATENT DOCUMENTS

| | | | |
|---|---|---|---|
| 5,675,124 A | 10/1997 | Stough et al. | |
| 5,844,171 A | 12/1998 | Fitzgerald | |
| 7,927,119 B2 | 4/2011 | Zahnen et al. | |
| 2013/0161090 A1* | 6/2013 | Nurmi | H02B 1/305 |
| | | | 174/653 |
| 2017/0324229 A1* | 11/2017 | Nooner | H02G 3/0462 |

\* cited by examiner

CABLE SEALING ASSEMBLY FOR AN ENCLOSURE

CROSS-REFERENCE TO RELATED APPLICATION

This application is a National Stage Application of PCT/EP2017/077661, filed on Oct. 27, 2017, which claims the benefit of U.S. Patent Application Ser. No. 62/414,324, filed on Oct. 28, 2016, the disclosures of which are incorporated herein by reference in their entireties. To the extent appropriate, a claim of priority is made to each of the above disclosed applications.

TECHNICAL FIELD

The present disclosure relates to sealed enclosures for use in telecommunications and/or electrical applications.

BACKGROUND

Enclosures (e.g., telecommunications and electrical enclosures) are typically sealed to inhibit the intrusion of foreign materials such as dust and moisture. By inhibiting the intrusion of foreign materials, internal components housed within the enclosures can be protected from damage. Standards have been established for defining the levels of sealing effectiveness for enclosures. For example, International Standard EN 60529 published by the International Electrotechnical Commission (IEC) sets forth ingress protection ratings used to define levels of sealing effectiveness for enclosures. The IP code (e.g., International Protection rating or Ingress Protection rating) set forth by International Standard EN 60529 consists of the letters IP followed by two numerical digits. The numbers that follow the IP have a defined meaning. The first digit indicates the level of ingress protection provided relating to solids such as dust. The second digit indicates the level of ingress protection provided relating to liquids such as water. By way of example, an enclosure rated for ingress protection level IP 65 provides total protection from dust ingress and also provides protection from low pressure water jets.

SUMMARY

One aspect of the present disclosure relates to a telecommunications enclosure for routing and/or storing one or more cables (e.g., cables carrying optical fibers), the enclosure having an elastomeric cable sealing component.

In some examples, the telecommunications enclosure is an IP 65 rated enclosure and the elastomeric sealing component is configured to prevent ingress of dust into the enclosure ingress. The sealing component can also prevent ingress of water from one or more sources, including but not limited to low pressure water jets.

In another aspect, the present disclosure relates to an elastomeric cable sealing component for a telecommunications enclosure, the sealing component having first and second sealing members that cooperate with each other to form the sealing component, each of the first and second sealing members comprising an elastomeric block, a plurality of flexible ribs integral with the block, and a groove disposed between each pair of adjacent flexible ribs.

In some examples, when the sealing component is in a sealing configuration, the first and second sealing members cooperate to form a labyrinth seal such that the ribs of one of the sealing members align with and are at least partially disposed in the grooves of the other of the sealing members.

In some examples, each of the flexible ribs of each of the elastomeric blocks of each of the sealing members includes a notch that faces a groove of the other sealing member when the sealing component is in a sealing configuration, the notches defining a channel through the sealing component when the sealing component is in the sealing configuration, the channel being defined by a central axis that is offset from a center point of at least one of the notches in each of the sealing members.

In some examples, the notches of each of the sealing members defines a row of notches having a first end and a second end opposite the first end, wherein each of the notches has a maximum width, and wherein the maximum width of the notches in the row alternatingly increases and decreases from the first end to the second end.

In some examples, the notches of each of the sealing members defines a row of notches having a first end, a second end opposite the first end, and a middle equidistant between the first end and the second end, wherein each of the notches has a maximum width, and wherein the maximum width of the notches generally increases from the first end to the middle, and wherein the maximum width of the notches generally decreases from the middle to the second end.

In a particular aspect of the present disclosure, a telecommunications enclosure comprises:
   an elastomeric sealing component comprising:
   first and second sealing members that cooperate with each other to form the elastomeric cable sealing component, each of the first and second sealing members comprising:
      an elastomeric block, a plurality of elastomeric ribs integral with the block, each of the elastomeric ribs comprising a notch having a maximum width, the plurality of elastomeric ribs forming a plurality of rows of the notches, wherein in each of the rows of the notches a groove is disposed between each pair of adjacent elastomeric ribs;
   wherein for each of the first and second sealing members, a first of the rows of notches has a first end and a second end opposite the first end, wherein the maximum width alternatingly increases and then decreases from the first end of the first row of notches to the second end of the first row of notches;
   wherein for each of the first and second sealing members, a second of the rows of notches has a first end, a second end opposite the first end, and a middle equidistant between the first end and the second end, wherein the maximum width of the notches generally increases from the first end of the second row of notches to the middle of the second row of notches, and wherein the maximum width of the notches generally decreases from the middle of the second row of notches to the second end of the second row of notches;
   wherein the first row of the notches of the first sealing member cooperates with the first row of notches of the second sealing member to define a first channel through the elastomeric cable sealing component when the sealing component is in a sealing configuration, wherein the second row of the notches of the first sealing member cooperates with the second row of notches of the second sealing member to define a second channel through the elastomeric cable sealing component when the sealing component is in a sealing configuration, wherein each of first and second channels is defined by a central axis that is offset from a center point of at least one of the notches forming the channel; and wherein the first and second sealing members cooperate to form a labyrinth seal such that for each of the first and second channels the ribs of one of the sealing members align with and are at least partially occupy the grooves of the other of the sealing members.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
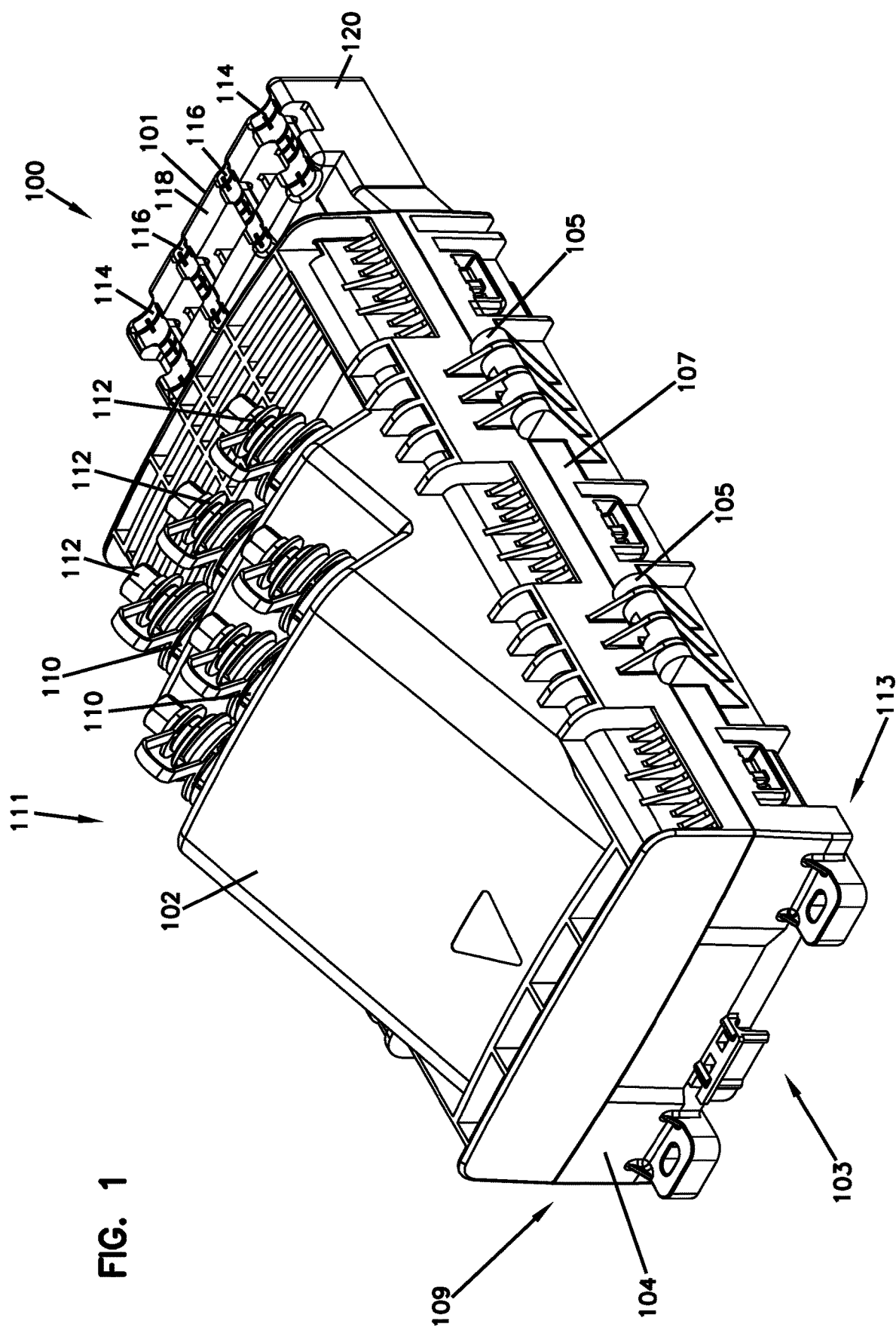
FIG. 1 is a top perspective view of an enclosure with sealing assembly in accordance with present disclosure, the enclosure being in a closed configuration.

Aspects of the present disclosure relate to enclosures for housing components such as telecommunication components or electrical components. The enclosures include ingress protection so as to protect the internal electrical or telecommunications components from foreign materials such as dust and moisture. In certain examples, enclosures in accordance with the present disclosure are at least IP 65 rated.

In this disclosure sealing assemblies in enclosures are described. These sealing assemblies are designed to reduce and/or prevent the ingress of foreign materials into the enclosure via cable ports that communicate with the interior of the enclosure as well as the outside environment. In some examples, the sealing assemblies of the present disclosure are configured to cooperate with cables passing through the sealing assemblies to create the necessary seal. In addition, the sealing assemblies of the present disclosure can be configured to provide protection against the ingress of foreign materials for cables of a variety of sizes entering the enclosure.

In general terms, this disclosure is directed to a cable sealing component for a telecommunications enclosure, the cable sealing component being configured to receive a cable passing through at least one cable port in the telecommunications enclosure and comprising: a pair of elastomeric sealing blocks operable between an open configuration and a sealing configuration; at least one pair of rib sets, a first rib set of the pair of rib sets being integral with a first of the pair of elastomeric sealing blocks, a second rib set of the pair of rib sets being integral with a second of the pair of elastomeric sealing blocks, each of the rib sets of the pair of rib sets comprising a plurality of flexible ribs having flexed and non-flexed positions, and a plurality of grooves, the ribs of the first rib set of the pair of rib sets occupying and/or at least partially aligning with the grooves of the second rib set of the pair of rib sets and the ribs of the second rib set of the pair of rib sets occupying and/or at least partially aligning with the grooves of the first rib set of the pair of rib sets when the sealing blocks are in the closed configuration and the ribs are in the non-flexed position; and/or wherein each of the ribs comprises a notch; and/or wherein notches of each of the rib sets defines a partial channel for receiving a cable; and/or wherein at least two of the notches in each of the rib sets in the first pair of rib sets have different sizes; and/or wherein each of the rib sets has a first end and a second end opposite the first end; and/or wherein the first end and the second end of the first rib set are located at ribs; and/or wherein the first end and the second end of the second rib set are located at grooves; and/or wherein each of the notches has a maximum width; and/or wherein for each of the rib sets the maximum width of the notches alternatingly increases and decreases from the first end to the second end; and/or wherein for each of the rib sets the maximum width of the notches generally increases from the first end to a midpoint equidistant between the first end and the second end and/or generally decreases from the midpoint to the second end; and/or wherein each of the notches has a center; and/or wherein when the sealing blocks are in the closed configuration a first line through the centers of the notches of the first rib set is offset from a second line through the centers of the notches of the second rib set; and/or wherein the first rib set is integral with a lower of the elastomeric sealing blocks, wherein the second rib set is integral with an upper of the elastomeric sealing blocks; and/or wherein when the sealing blocks are in the closed configuration, the first line is above the second line; and/or wherein the first rib set has N ribs and N-1 grooves; and/or wherein the second rib set has N-1 ribs and N grooves; and/or wherein when the elastomeric sealing blocks are in the sealing configuration the partial channels of the first and second rib sets form a complete channel for receiving and sealing a cable within the complete channel; and/or wherein when the elastomeric sealing blocks are in the sealing configuration the ribs of the first and second rib sets intermesh to form a labyrinth-type seal about a cable; and/or wherein the sealing component is configured to form a seal at at least an IP 65 rating; and/or wherein when the elastomeric sealing blocks are in the sealing configuration a first side of the cable sealing component comprises a first port in communication with the environment exterior to the enclosure and a second side of the sealing component opposite the first side comprises a second port opposite the first port, the second port being in communication with an interior of the enclosure; and/or wherein the first port is removably pluggable with an elastomeric plug; and/or wherein the cable sealing component comprises two or more pairs of rib sets, each of the pairs of rib sets being in accordance with one or more of the preceding characteristics.

Specific features of aspects of the present disclosure will now be described with reference to the accompanying figures.

Figure 2:
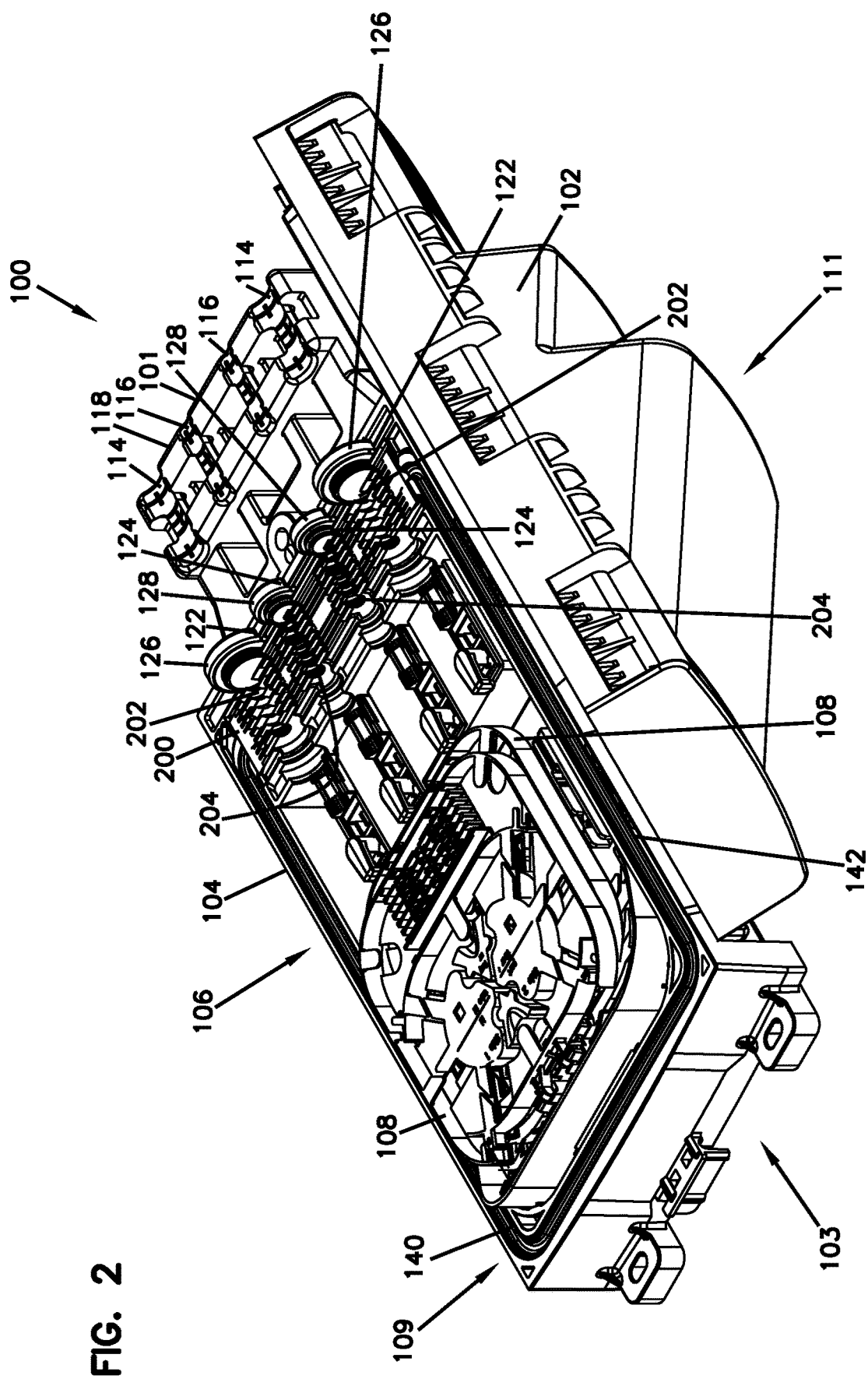
FIG. 2 is top a perspective of the enclosure of FIG. 1, the enclosure being in an open configuration.
Figure 3:
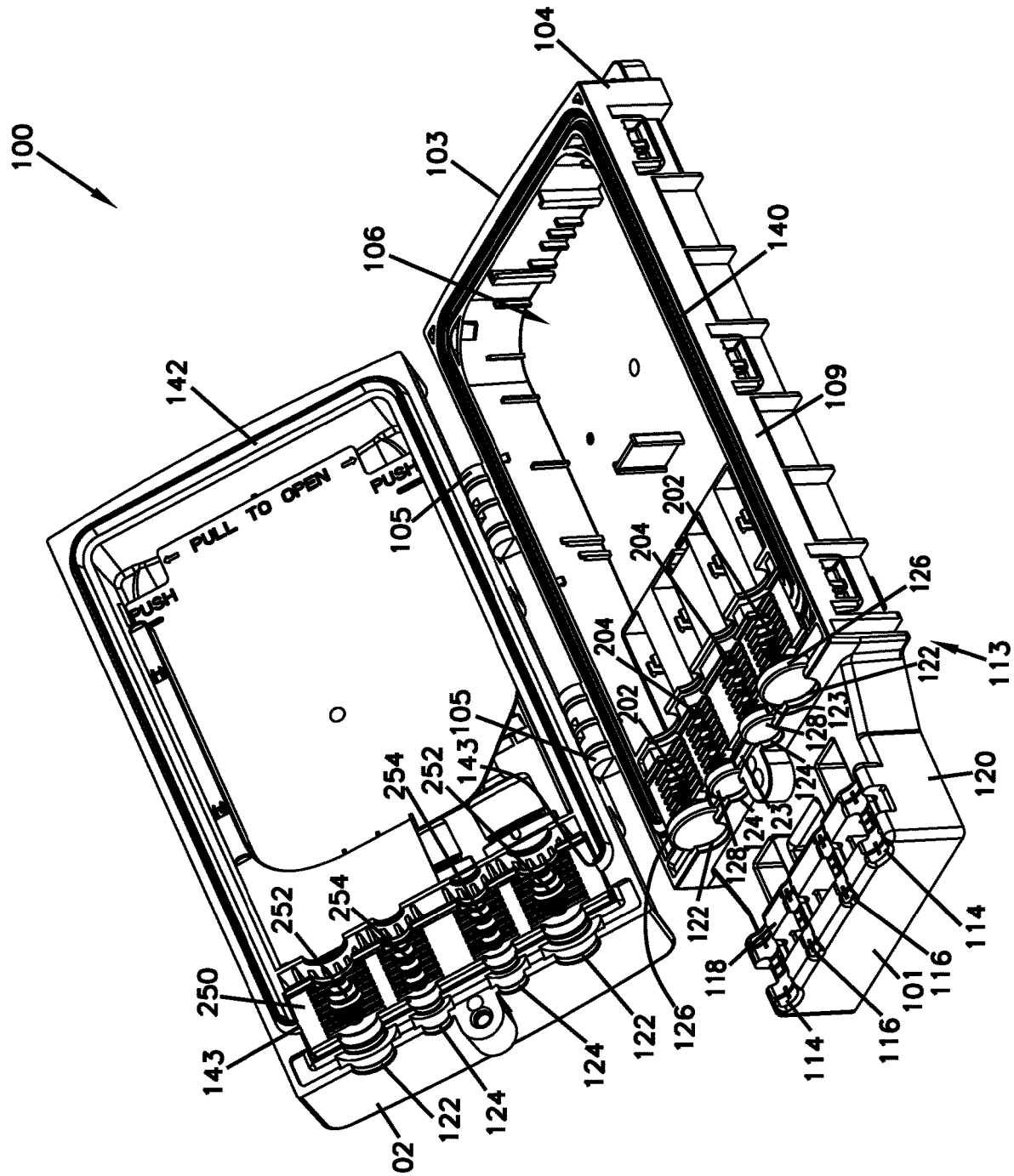
FIG. 3 is a further perspective view of the enclosure of FIG. 1 with certain components removed from the interior space of the enclosure, the enclosure being in an open configuration.
Figure 4:
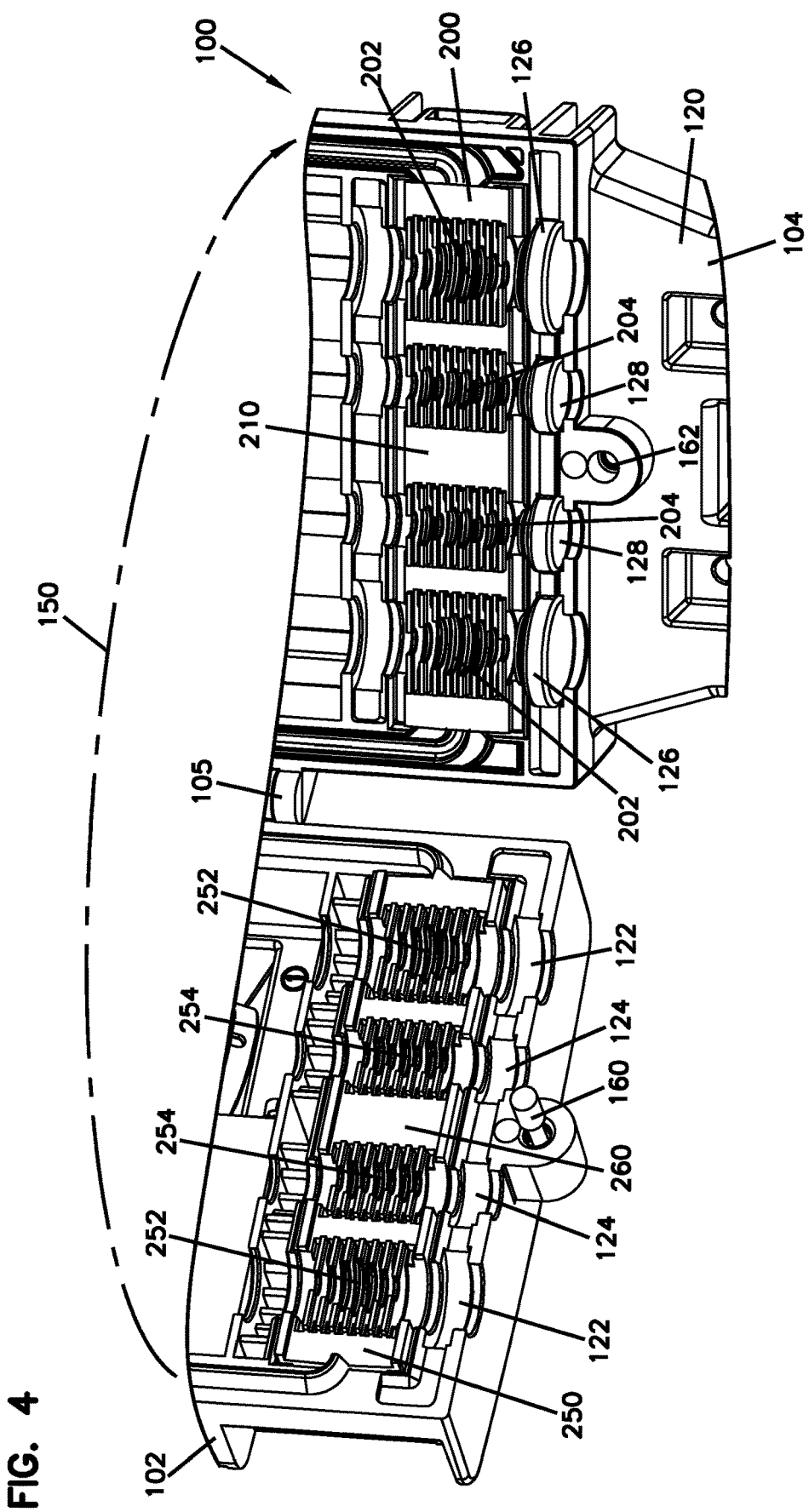
FIG. 4 is a perspective view of a portion of the enclosure of FIG. 3 in an open configuration.

FIG. 1 is a perspective view of an example enclosure 100 with sealing assembly in accordance with present disclosure, the enclosure 100 being in a closed configuration. FIG. 2 is a perspective view of the enclosure 100 of FIG. 1, the enclosure 100 being in an open configuration. FIG. 3 is a further perspective view of the enclosure 100 100 of FIG. 1 with certain components removed from the interior space of the enclosure, the enclosure 100 being in an open configuration. FIG. 4 is a perspective view of a portion of the enclosure 100 of FIG. 3 in an open configuration.

The enclosure 100 is preferably configured for protecting components (e.g., electrical components or telecommunications components such as optical fibers, fiber optic splices, fiber optic splice trays, passive optical splitters, wavelength division multiplexers, or other structures) from foreign materials such as dirt, dust, and water. In some examples, the enclosure 100 is re-enterable so that the enclosure 100 can be selectively opened and closed so as to provide access to an interior space 106 of the enclosure 100 in which the components desired to be protected are housed.

Referring to FIGS. 1-4, the enclosure 100 includes a first housing component 102 and a second housing component 104 that cooperate to move the enclosure 100 from an open configuration to a closed configuration. For example, the first housing component 102 and the second housing component 104 can be connected by one or more hinges 105 that permit the first and second housing components 102 and 104 to be pivoted relative to each other between an open configuration and a closed configuration without entirely decoupling the first housing component from the second housing component. Referring to FIG. 4, the first housing component 102 can be rotated about the hinge 105 in the direction of the arrow 150 to move the enclosure from the open configuration to the closed configuration.

The enclosure 100 is generally defined by a first end 101 and a second end 103 opposite the first end 101; a first side 107 and an opposing second side 109; and a top 111 and an opposing bottom 113. The terms "first end," "second end," "first side," "second side," "top" and "bottom" are used herein for convenience of reference only, and do not limit the shape or structure of the disclosed enclosures or how they may be positioned.

The enclosure 100 defines an interior space 106. The interior space 106 can be used for a variety of functions such as housing and routing wires or cables. For example, the enclosure 100 can be positioned "in the field," e.g., in the outdoors in or near a neighborhood or a particular building requiring fiber optic network connectivity. One or more feeder cables and/or branch cables routed from a network service provider can be routed to the enclosure 100 and enter the enclosure 100 via cable ports in the enclosure. Optical fibers from the cables can then be organized and distributed, e.g., by optical fiber trays 108 installed in the interior space 106, the organized fibers being routed to customers via pluggable connectorized ports 110. In the example shown in FIGS. 1-2, the connectorized ports 110 include removable plugs 112.

The example enclosure 100 includes a first pair of cable conduits 114 and a second pair of cable conduits 116. The cable conduits 114 and 116 are partial cylindrical depressions in a top surface 118 of an extension 120 of the second housing component 104, the extension 120 disposed at the first end 101 of the enclosure 100. The cable conduits 114 and 116 can be sized to receive specifically sized cables or ranges of sizes of cables (e.g., branch or feeder cables). In the example enclosure 100, the cable conduits 114 are wider than the cable conduits 116; that is, the cable conduits 114 are configured to receive cables of generally greater diameter than the cable conduits 116.

Moving from the first end 101 towards the opposing second end 103 of the enclosure 100, the cable conduits 114 and 116 lead to cable ports through which cables in the cable conduits can enter the interior space 106. In the example shown, each of the larger cable conduits 114 leads to one of a first pair of cable ports 122, and each of the smaller cable conduits 116 leads to one of a second pair of cable ports 124. The cable ports 122 are larger than the cable ports 124, corresponding to the relatively larger-sized cable for passing through the cable ports 122. Optionally, each of cable the ports (122, 124) includes a removable plug, e.g., an elastomeric plug. Each of the larger cable ports 122 optionally includes a removable plug 126 and each of the smaller cable ports 124 optionally includes a removable plug 128. The plugs (126, 128) are sized to seal off their respective ports (122, 124) by covering the port and sealingly interfacing with the first housing component 102 and the second housing component 104 when the enclosure 100 is in the closed configuration. The plugs (126, 128) are optionally installed in the ports (122, 124) when cables are not being routed into the interior of the enclosure 100. The plugs (126, 128) are removed in order to route cables through the ports (122, 124). In some examples all of the plugs (126, 128) are formed (e.g., molded) as a unitary piece, connected by connectors 123.

Along the end and sides of the enclosure 100 through which cables do not enter the interior space 106 via ports, an edge seal formed when the enclosure 100 is in the closed configuration is provided by an interference fit between an edge seal groove 140 in the second housing component 104, and a corresponding edge seal strip 142 (e.g. an elastomer) on the first housing component 102. Sealing the enclosure from contaminant ingress via the cable ports is the function of the cable sealing component of the enclosure 100, which is described below. In some examples the ends 143 (FIG. 3) of the edge seal formed between the edge seal groove 140 and the edge seal strip 142 are configured to abut one or both of the sealing blocks of the sealing component to complete a seal of pre-defined rating (e.g., at least IP 65 rating) around the entire perimeter of the enclosure 100.

Within the interior space 106 a first sealing block 200 is disposed in an appropriately sized sealing cavity of the second housing component 104. The first sealing block 200 is a first sealing member which, together with a corresponding second sealing block 250 disposed in the first housing component 102 forms a cable sealing component. Specifically, the first sealing block 200 and the second sealing block 250 are configured to cooperate with each other when the enclosure 100 is in the closed configuration in order to form a cable sealing component of the enclosure 100.

In the example shown in FIGS. 1-4, each of the first sealing block 200 and the second sealing block 250 includes four partial channels. More or fewer partial channels can be provided depending on the number of cable ports and the configuration of each of the partial channels can depend on the type of cable it is configured to accommodate. Furthermore, although all four partial channels are integral with a single sealing block (200, 250) in alternative examples, a separate sealing block can be used for each partial channel, and inserted independently in the enclosure 100.

In the example shown in FIGS. 1-4, the four partial channels in each sealing block (200, 250) are generally parallel to one another, and each of the four partial channels extends from one of the four cable ports (122, 124) towards the second end 103. More or fewer partial channels can be provided depending on the number of cable ports, and the configuration of each of the partial channels can depend on the type or size of cable it is configured to accommodate. In any case, the number of partial channels in the second sealing block 250 equals the number of partial channels in the first sealing block 200. Each of a first pair of partial channels (202, 252) extends from one of the relatively large cable ports 122, and each of a second pair of partial channels (204, 254) extends from one of the relatively small cable ports 124. Each of the partial channels (202, 204) in the first sealing block 200 cooperates with the respective partial channel (252, 254) in the second sealing block 250 to receive and seal a cable therebetween when the enclosure 100 is in the closed configuration.

The sealing block (200, 250) can be made from an elastomeric material such as, but not limited to, silicone. In some examples, the sealing block (200, 250) is made from silicone having a durometer of between about 20 to about 30 Shore A. In some examples, the silicone has a durometer of about 25 Shore A.

In the example shown, the four partial channels in the second sealing block 250 are generally parallel to one another, and each of the four partial channels extends from one of the four cable ports (122, 124) into the interior of the enclosure 100. Each of a first pair of partial channels 252 extends from one of the relatively large cable ports 122, and each of a second pair of partial channels 254 extends from one of the relatively small cable ports 124. Each of the partial channels (252, 254) is adapted to receive a cable. Each of the partial channels 252 is positioned to align with one of the partial channels 202 when the enclosure 100 is in the closed configuration to form a complete channel for providing a labyrinth seal about a cable. Likewise, each of the partial channels 254 is positioned to align with one of the partial channels 204 when the enclosure 100 is in the closed configuration to form a complete channel for providing a labyrinth seal about a cable. In addition, as will be described in greater detail below, the configuration of the partial channels 252 matches, in some respects, that of the partial channels 202, while the configuration of the partial channels 254 matches, in some respects, that of the partial channels 204.

In addition, the bottom face 260 of the second sealing block 250 faces the top face 210 of the first sealing block 200 when the enclosure 100 is in the closed configuration. In some examples the top face 210 of the first sealing block 200 sealingly abuts the bottom face 260 of the second sealing block 250 when the enclosure 100 is in the closed configuration. As shown in FIG. 4, a fastener, such as a bolt 160 in the first housing component 102 can be secured in a fastener receiver, such as the hole 162 in the second housing component 104 to lock the enclosure 100 closed.

The detailed structures of the partial channels (202, 204, 252, 254) will now be described.

Figure 5:
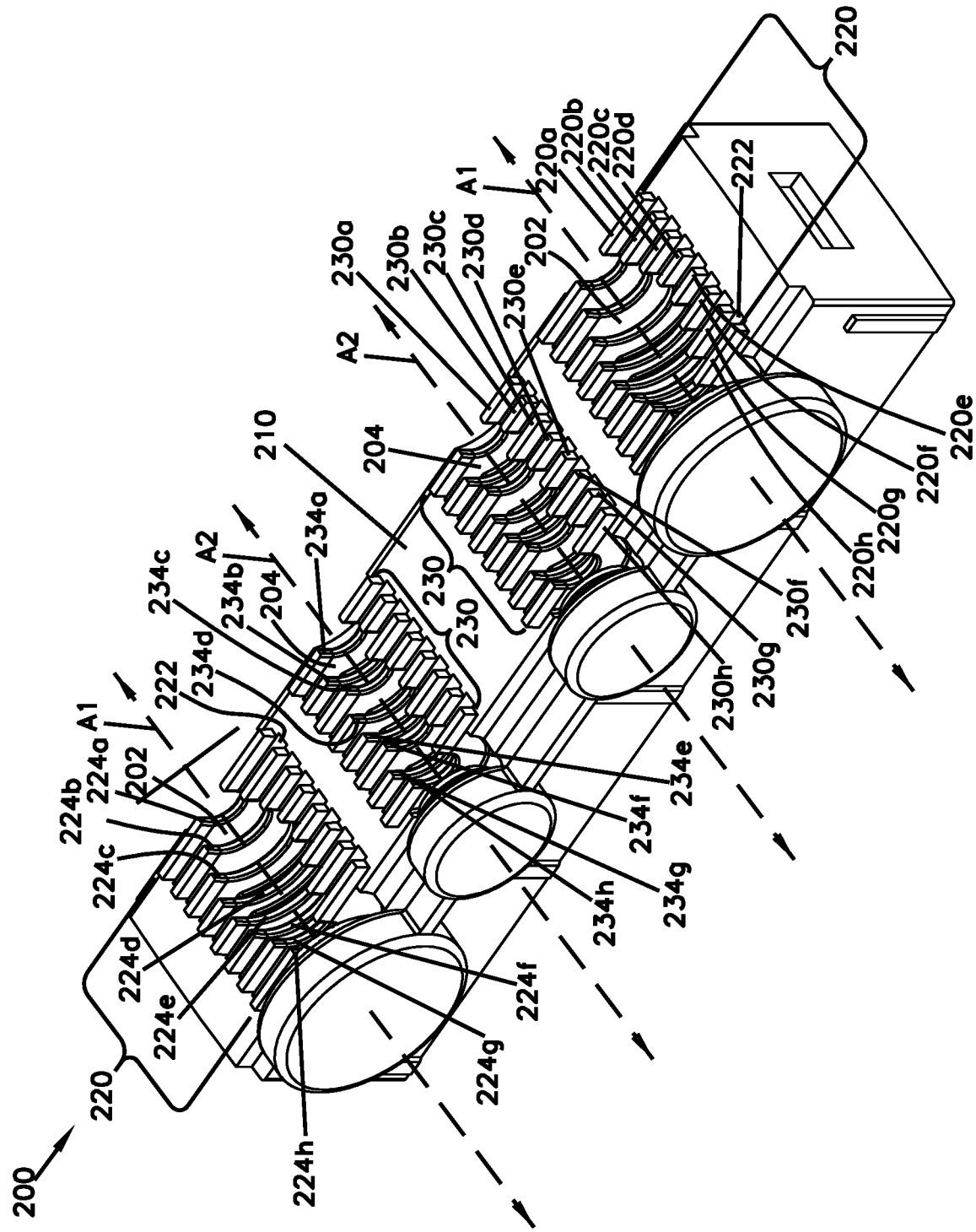
FIG. 5 is a top perspective view of a first sealing block of FIG. 4.
Figure 6:
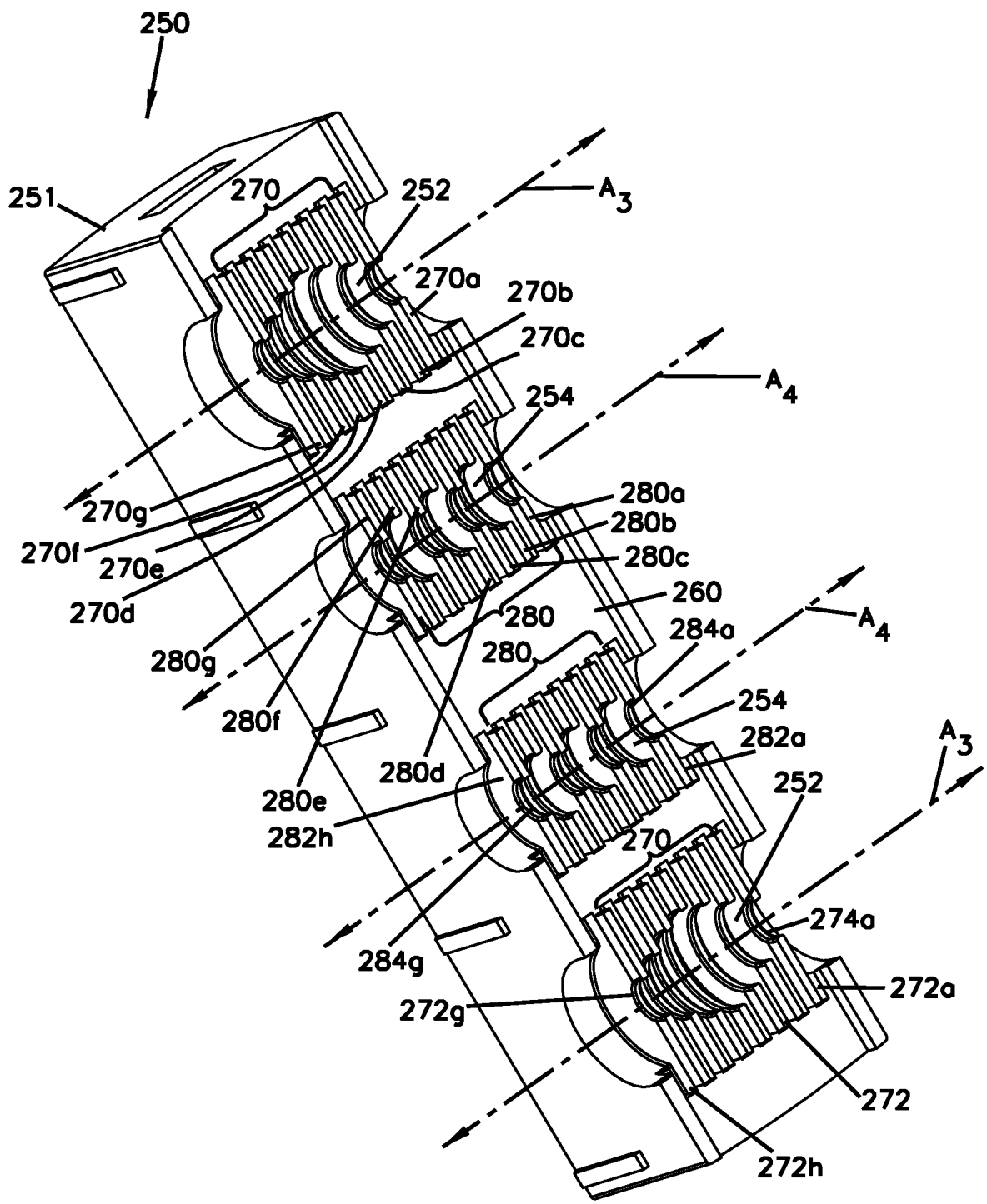
FIG. 6 is a bottom perspective view of a second sealing block of FIG. 4.

FIG. 5 is a top perspective view the first sealing block 200 of FIG. 4. FIG. 6 is a bottom perspective view of the second sealing block 250 of FIG. 4.

Referring to FIG. 5, the first sealing block 200 includes the two partial channels 202 and the two partial channels 204 described above. For each of the partial channels (202, 204), a set (220, 230) of N elastomeric ribs is integral with the sealing block 200. N can be an even positive integer or an odd positive integer. In some examples N is at least 4. In further examples, N can be 5, 6, 7, 8, 9, 10, 11, 12 or more.

In the particular example shown, N=8, each of the sets 220 including ribs 220$a$, 220$b$, 220$c$, 220$d$, 220$e$, 220$f$, 220$g$ and 220$h$, and each of the sets 230 including ribs 230$a$, 230$b$, 230$c$, 230$d$, 230$e$, 230$f$, 230$g$ and 230$h$. Each rib of the set (220, 230) of ribs protrudes upward beyond the top face 210 of the sealing block 200. Between each pair of adjacent ribs of the set (220, 230) of ribs is a groove (222, 232) for a total of N-1 grooves for each set (220, 230) of ribs. In the example shown, each set (220, 230) of ribs includes seven grooves. The rib (220$a$, 230$a$) defines a first end of each of the partial channels (202, 204), respectively, and the rib (220$h$, 230$h$) defines a second end of the partial channels (202, 204), respectively, opposite to the first end, with a midpoint of the partial channels (202, 204) being defined as the point equidistant between the first end and the second end along the longitudinal axis ($A_1$, $A_2$), respectively, of the partial channels (202, 204).

Each of the elastomeric ribs for each set (220, 230) of ribs has a corresponding notch forming sets (224, 234), respectively of notches. Generally speaking, at least two notches in at least one of the notch sets have different sizes. In some examples, at least two notches in each of the notch sets have different sizes. In some examples, for each set of notches a plurality of the notches have a first size and a plurality of notches have a second size that is different from the first size. Non-limiting specific examples of notch size configurations will be described below.

The set 224 of notches for each set 220 of ribs spans from notch 224$a$ through notch 224$h$. Likewise, the set 234 of notches for each set 230 of ribs spans from notch 234$a$ through notch 234$h$. A maximum width (proportional to the notch size) of each of the notches in each of the sets 224 of notches is bisected by the Axis $A_1$ and a maximum width of each of the notches of the sets 234 is bisected by the Axis $A_2$. In the example ribs shown in the figures, a portion of each of the notches forms a curved cutout (e.g., a cutout shaped like an arc of a circle defined by a radius of curvature) in its respective rib, with a straight extension extending from each of the endpoints of the curved cutout.

Figure 8:
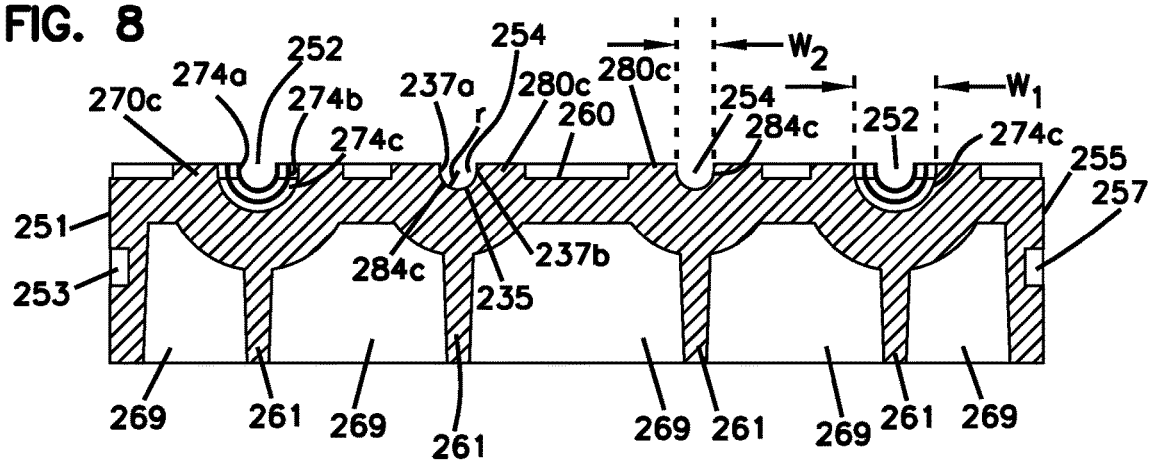
FIG. 8 is a cross-sectional view of the sealing block of FIG. 6 taken along the line A-A in FIG. 7.

This can be seen more clearly in one of the notches 284$c$ shown in FIG. 8, in which a curved portion 235 of the notch 284$c$ is defined by a radius of curvature r, and two straight extensions 237$a$ and 237$b$ extend from the end points of the curved portion 235. Still with reference to FIG. 8, the maximum width of the notch 284$c$ is the shortest distance between the straight extensions 237$a$ and 237$b$. This definition of notch maximum width extrapolates to all notches in the figures. Thus, it should be appreciated that, for a given notch in the depicted embodiments, the maximum width of the notch is proportional to the radius of curvature of its curved portion, and notches of different size can have curved portions with different radii of curvature. It should also be appreciated that the notches can take on different configurations from that shown in the figures; for example, the notches can have an entirely curved border without straight extensions.

Returning to FIG. 5, the maximum width of the notches in each of the sets 224 generally increases from the first end of the partial channel 202 to the midpoint of the partial channel 202, and generally decreases from the midpoint of the partial channel 202 to the second end of the partial channel 202. By "generally increases" and "generally decreases" is meant that, for all of the notches in the set 224, a first notch that is closer to the midpoint of one of the partial channels 202 than a second notch may have an equal or larger maximum width than the second notch, but may not have a smaller maximum width than the second notch. In the particular non-limiting example shown in FIG. 5, for each of the sets 224, the notches 224a and 224h have equal maximum widths that are the smallest in the set 224; the notches 224b and 224g have equal maximum widths that are larger than the maximum width of the notches 224a and 224b; the notches 224c and 224f have equal maximum widths that are larger than the maximum width of the notches 224b and 224g; and the notches 224d and 224e, which are notches closest to the midpoint of the partial channels 202, have equal maximum widths that are larger than the maximum width of the notches 224c and 224f. The configuration of notch sizes described in this paragraph can be particularly effective at sealingly accommodating a range of relatively larger diameter cables, e.g., feeder cables.

As shown in FIG. 5, the maximum width of the notches in the set 234 generally alternates in relative size from the first end of the partial channel 204 to the second end of the partial channel 204. By "generally alternates" is meant that for all of the notches in the set 234 starting from the first end and moving towards the second end of the partial channel 204, any increase in maximum width size of adjacent notches will be followed by a decrease in maximum width size of adjacent notches before another increase in maximum width size of adjacent notches. In the particular example shown in FIG. 4, and moving from the first end of the partial channel 204 to the second end of the partial channel 204, the notch 234b has a maximum width that is larger than the maximum width of the adjacent notch 234a; the notch 234c has a maximum width that is smaller than the maximum width of the adjacent notch 234b; the notch 234d has a maximum width that is larger than the maximum width of the adjacent notch 234c; the notch 234e has a maximum width that is equal to the maximum width of the adjacent notch 234d; the notch 234f has a maximum width that is smaller than the maximum width of the adjacent notch 234e; the notch 234g has a maximum width that is larger than the maximum width of the adjacent notch 234f; and the notch 234h has a maximum width that is smaller than the maximum width of the adjacent notch 234g. The configuration of notch sizes described in this paragraph can be particularly effective at sealingly accommodating a range of relatively smaller diameter cables, e.g., branch cables.

Each of the sets 224 of the notches defines the first partial channel 202. The configuration of the set 224 of notches forms a partial channel 202 that, as mentioned above, can be particularly good at accommodating and sealing a range of different sizes of relatively larger cables, such as feeder cables, e.g., cables ranging in diameter from about 6 mm to about 15 mm.

Each of the sets 234 of the notches defines the first partial channel 204. The configuration of the set 234 of notches forms a partial channel 204 that, as mentioned above, can be particularly good at accommodating and sealing a range of different sizes of relatively smaller cables, such as branch cables, e.g., cables ranging in diameter from about 6 mm to about 11.5 mm.

Referring to FIG. 6, the second sealing block 250 includes the two partial channels 252 and the two partial channels 254 described above. For each of the partial channels (252, 254), a set (270, 280) of N-1 elastomeric ribs is integral with the sealing block 250. Thus, for each complete channel formed by a partial channel on each of the first and second sealing blocks, one of the sealing blocks has N ribs and N-1 grooves, and the opposing sealing block has N-1 ribs and N grooves in the corresponding partial channel. In the particular example shown in FIGS. 5-6, all of the partial channels in the first sealing block 200 include N ribs and N-1 grooves, and all of the partial channels in the second sealing block 250 include N-1 ribs and N grooves.

Returning to FIG. 6 specifically, in this example, as stated previously, N=8, and each of the sets 270 of ribs includes ribs 270a, 270b, 270c, 270d, 270e, 270f, and 270g and each of the sets 280 of ribs includes ribs 280a, 280b, 280c, 280d, 280e, 280f, and 280g. Each rib of the set 270 of ribs protrudes upward beyond the bottom face 260 of the sealing block 250. Each rib is between a pair of adjacent grooves (272, 282) for a total of N grooves for each set (270, 280) of ribs. In the example shown, each set (270, 280) of ribs includes eight grooves (272, 282).

The groove (272a, 282a) defines a first end of each of the partial channels (252, 254), respectively, and the groove (272h, 282h) defines a second end of each the partial channels (252, 254), respectively, opposite to the first end, with a midpoint of the partial channels (252, 254) being defined as the point equidistant between the first end and the second end along the longitudinal axis ($A_3$, $A_4$), respectively, of the partial channels (252, 254).

Each of the elastomeric ribs for each set (270, 280) of ribs has a corresponding notch forming sets (274, 284), respectively, of notches. The set 274 of notches for each set 270 of ribs spans from notch 274a through notch 274g. Likewise, the set 284 of notches for each set 280 of ribs spans from notch 284a through notch 284g. A maximum width of each of the notches in each of the sets 274 of notches is bisected by the Axis $A_3$ and a maximum width of each of the notches of the sets 284 is bisected by the Axis $A_4$. In the example shown, a portion of each of the notches forms a curved cutout (e.g., a cutout shaped like an arc of a circle) in its respective rib.

As shown in FIG. 6, the maximum width of the notches in each of the sets 274 generally increases from the first end of the partial channel 252 to the midpoint of the partial channel 252, and generally decreases from the midpoint of the partial channel 252 to the second end of the partial channel 252.

As shown in FIG. 5, the maximum width of the notches in the set 284 generally alternates in relative size from the first end of the partial channel 254 to the second end of the partial channel 254.

Each of the sets (274, 284) of the notches defines its respective partial channel (252, 254). The configuration of each set 274 of notches forms a partial channel 252 that can be particularly good at accommodating and sealing a range of different sizes of relatively larger cables, such as feeder cables, e.g., cables ranging in diameter from about 6 mm to about 15 mm. The configuration of the set 284 of notches forms a partial channel 254 that can be particularly good at accommodating and sealing a range of different sizes of relatively smaller cables, such as branch cables, e.g., cables ranging in diameter from about 6 mm to about 11.5 mm. The sealing blocks are configured to cooperate together such that, when the enclosure is in a closed configuration, each partial channel 202 forms a complete cable channel with a partial channel 252, and each partial channel 204 forms a complete cable channel with a partial channel 254.

Figure 7:
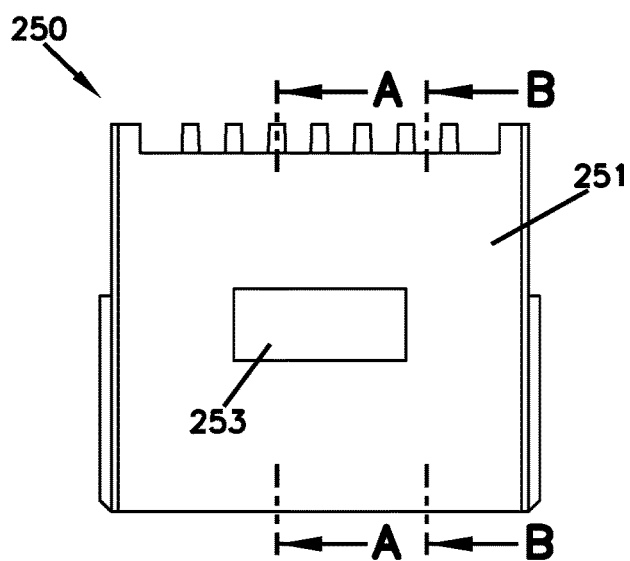
FIG. 7 is a side view of the sealing block of FIG. 6.
Figure 9:
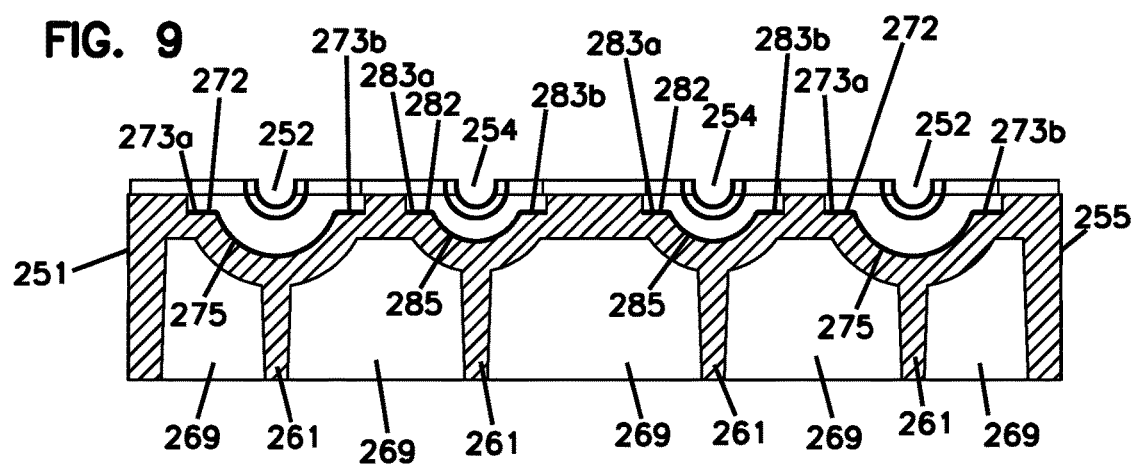
FIG. 9 is a cross-sectional view of the sealing block of FIG. 6 taken along the line B-B in FIG. 7.

FIG. 7 is a side view of the sealing block 250 of FIG. 6. FIG. 8 is a cross-sectional view of the sealing block 250 of FIG. 6 taken along the line A-A in FIG. 7. FIG. 9 is a cross-sectional view of the sealing block 250 of FIG. 6 taken along the line B-B in FIG. 7. The principles of following discussion of FIGS. 7-9 could apply equally to the sealing block 200 of FIG. 5.

Referring to FIG. 7, the sealing block 250 has a side 251, which is also shown for reference in FIG. 6. Recesses 253, 257 formed in the side 251 and the opposing side 255 of the sealing block 250 can fit interferingly with corresponding protrusions in the enclosure 100 to secure the sealing block 250 to the enclosure.

Referring to FIG. 8 the two partial channels 252 and the two partial channels 254 are shown in cross-section. Three notches (274c, 274b, 274a) of decreasing size are visible in each of the partial channels 252. A single notch 284c is visible in each of the partial channels 254. A maximum width of the notch 274c is shown as $w_1$; and a maximum width of the notch 284c is shown as $w_2$. In this example, each set of ribs has a foot 261 that extends from a lower portion of the rib set up to the top 259 of the sealing block 250. As shown, in this example, much of the sealing block 250 consists of hollow chambers 269, the feet 261, together with the sides of the sealing block 250, forming boundaries of the hollow spaces. The hollow spaces can be configured to be received by corresponding mating features of the enclosure 100 to secure the sealing block 250 in the enclosure.

Referring to FIG. 9, the cross-section B-B is taken through grooves 272 and 282, rather through ribs as in FIG. 8. Thus, FIG. 9 shows a depth profile of the grooves 272 and 282. Each of the grooves 272 has a cable receiving portion 275. On either side of the cable receiving portion 275 are rib receiving portions 273a and 273b which receive a rib from the sealing block 200. Similarly, the grooves 282 have a cable receiving portion 285; and on either side of the cable receiving potion 285 are rib receiving portions 283a and 283b which receive a rib from the sealing block 200. The size of the cable receiving portions (275, 285) are at least as large, and their depth at least as great, as the size and depth, respectively, of the largest rib notch in the notch set (274, 284) in the respective partial channel (252, 254) so as not to interfere with the cable sealing action of the ribs. The size and depth of the rib receiving portions (273a, 273b, 283a, 283b) are selected so as to provide complete channels (300, 302) that are squashed in one dimension as will be discussed in greater detail below in connection with FIG. 11.

Figure 10:
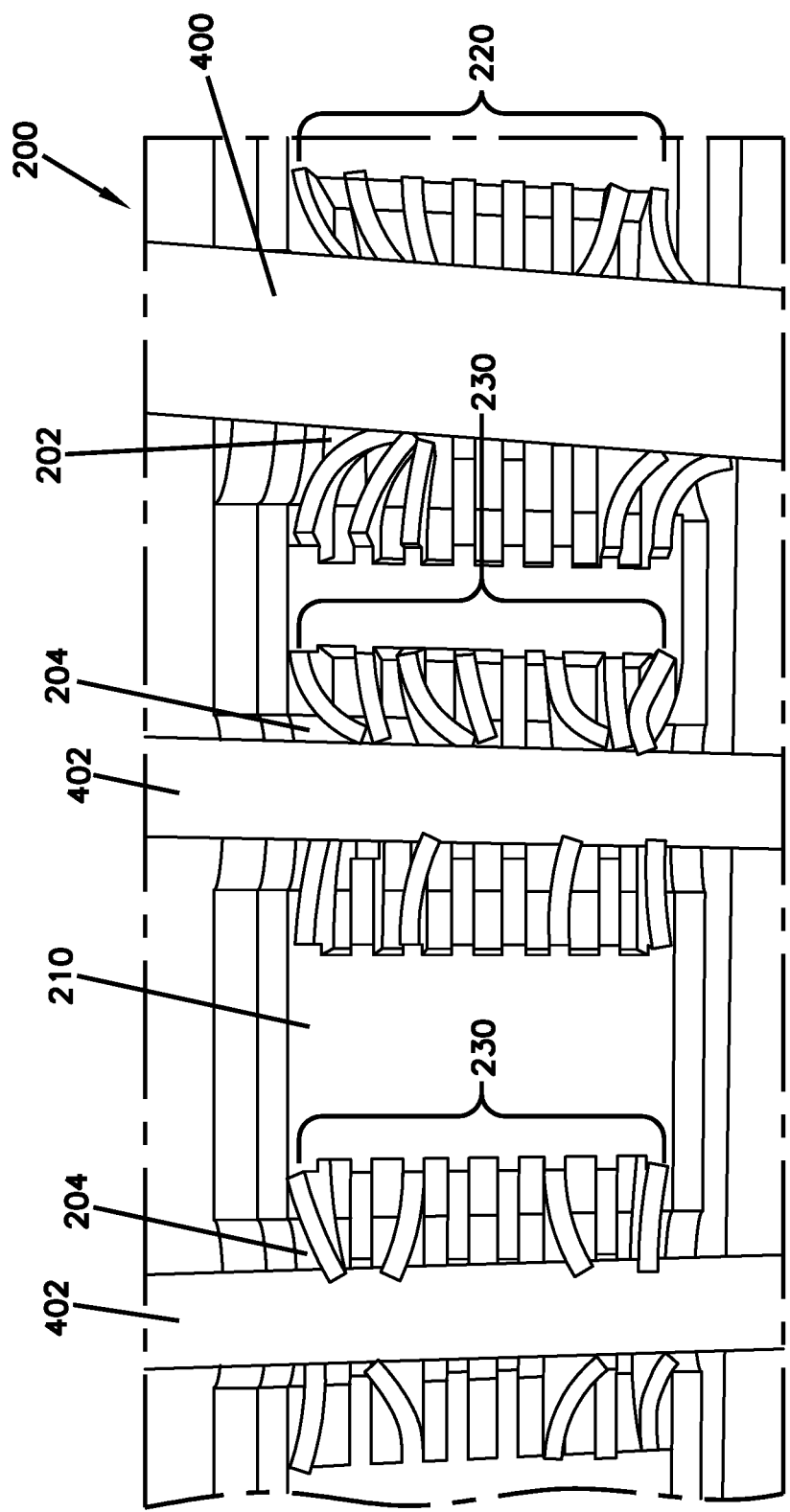
FIG. 10 is a top view of a portion of the sealing block of FIG. 5, including a plurality of cables.

FIG. 10 is a top view of a portion of the sealing block 200 of FIG. 5, including a plurality of cables disposed in the partial channels thereof. Referring to FIG. 10, the first sealing block 200 includes the top face 210, one of the first partial channels 202, the two second partial channels 204, the first set 220 of ribs and two sets of the second set 230 of ribs, as discussed above.

In this example, the visible first partial channel 202 is accommodating a relatively large diameter cable 400 (e.g., a feeder cable), and each of the second partial channels 204 is accommodating a relatively small diameter cable 402 (e.g., a branch cable). With respect to each of the first partial channel 202 and the second partial channels 204, the cables (400, 402) cause a greater deflection or flex in the flexible ribs of the rib sets (220, 230) having smaller maximum width as compared with the flexible ribs having larger maximum width. The alternating notch sizes of the second partial channels 204 establish a particularly effective labyrinth seal (when the sealing block 200 is intermeshed with the sealing block 250 as described in more detail below) about relatively smaller diameter cables such as cables 402. The varying notch sizes of the first partial channels 202 establish a particularly effective labyrinth seal (when the sealing block 200 is intermeshed with the sealing block 250) about relatively larger diameter cables such as the cable 400.

It should be appreciated, as illustrated in FIG. 10, that the introduction of cables into the cable channels of the sealing components of the present disclosure can reposition one or more of the flexible ribs such that one or more ribs of one of the sealing blocks do not entirely align with and/or occupy the grooves of the opposing sealing block. The descriptions herein of the ribs of one sealing block occupying the grooves of the other will typically occur when a cable has not yet been introduced to the cable channel and the ribs are in a non-flexed position.

Figure 11:
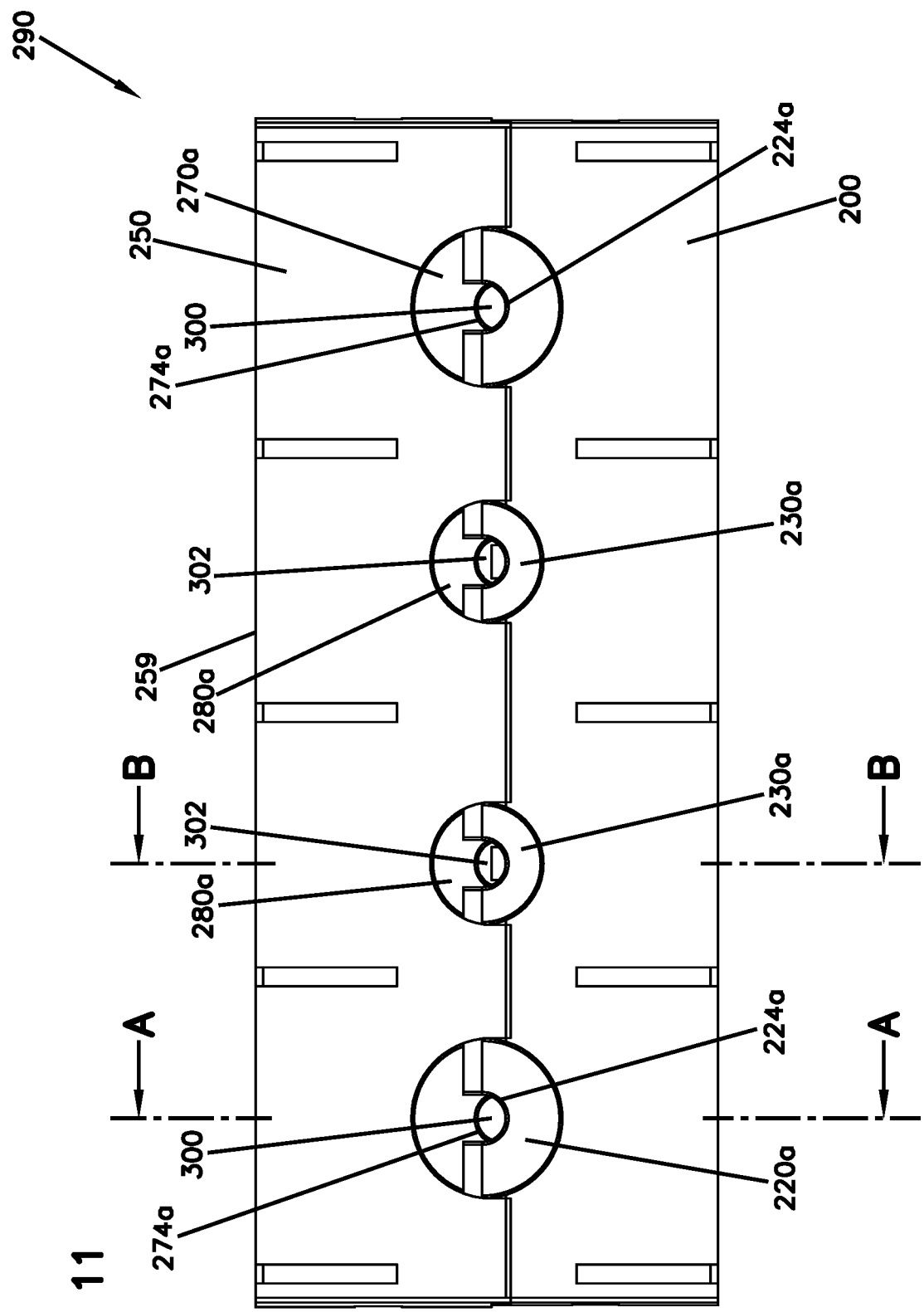
FIG. 11 is a rear view of a cable sealing component in accordance with the present disclosure.
Figure 12:
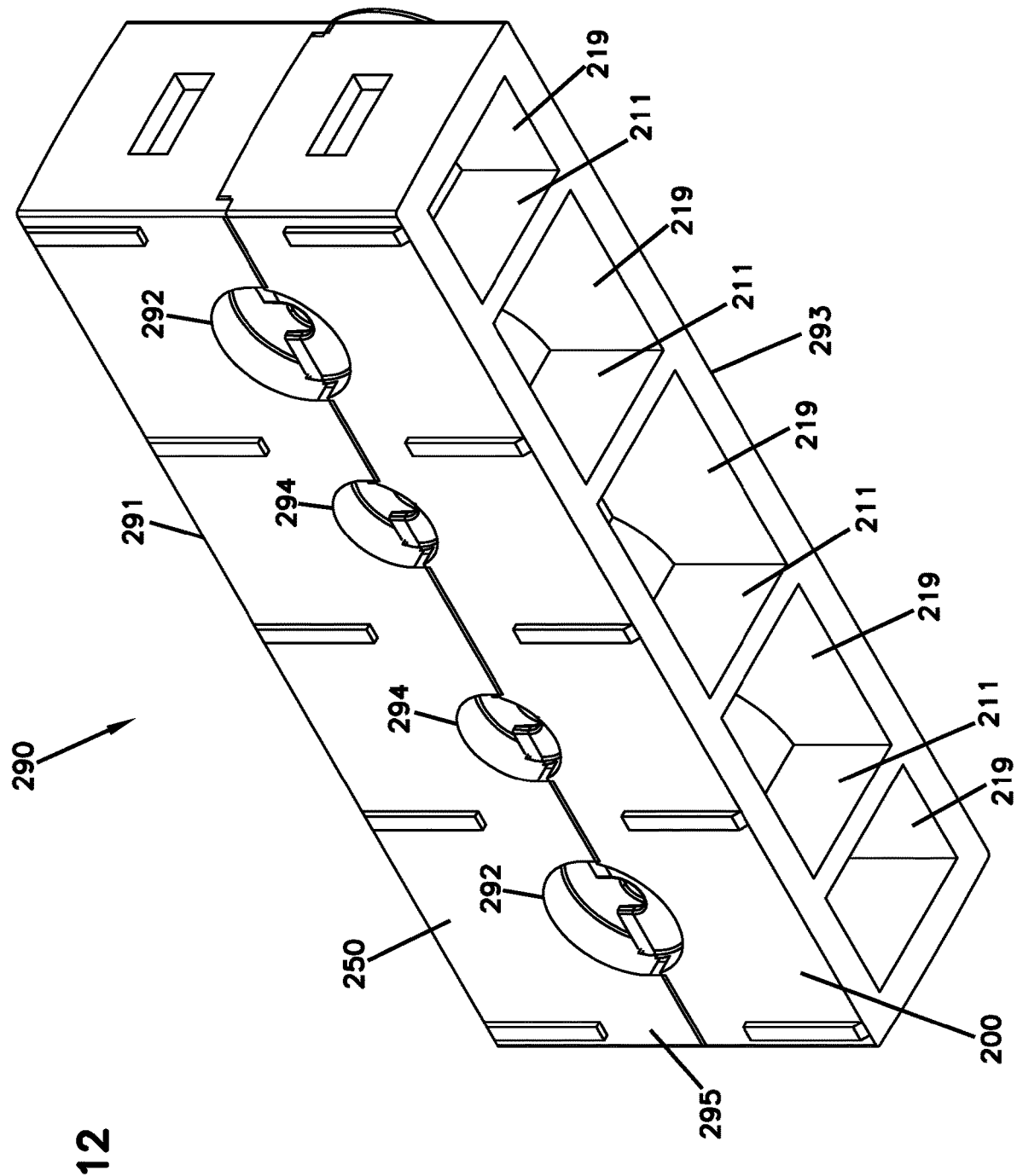
FIG. 12 is a rear, bottom perspective view of the cable sealing component of FIG. 11.
Figure 13:
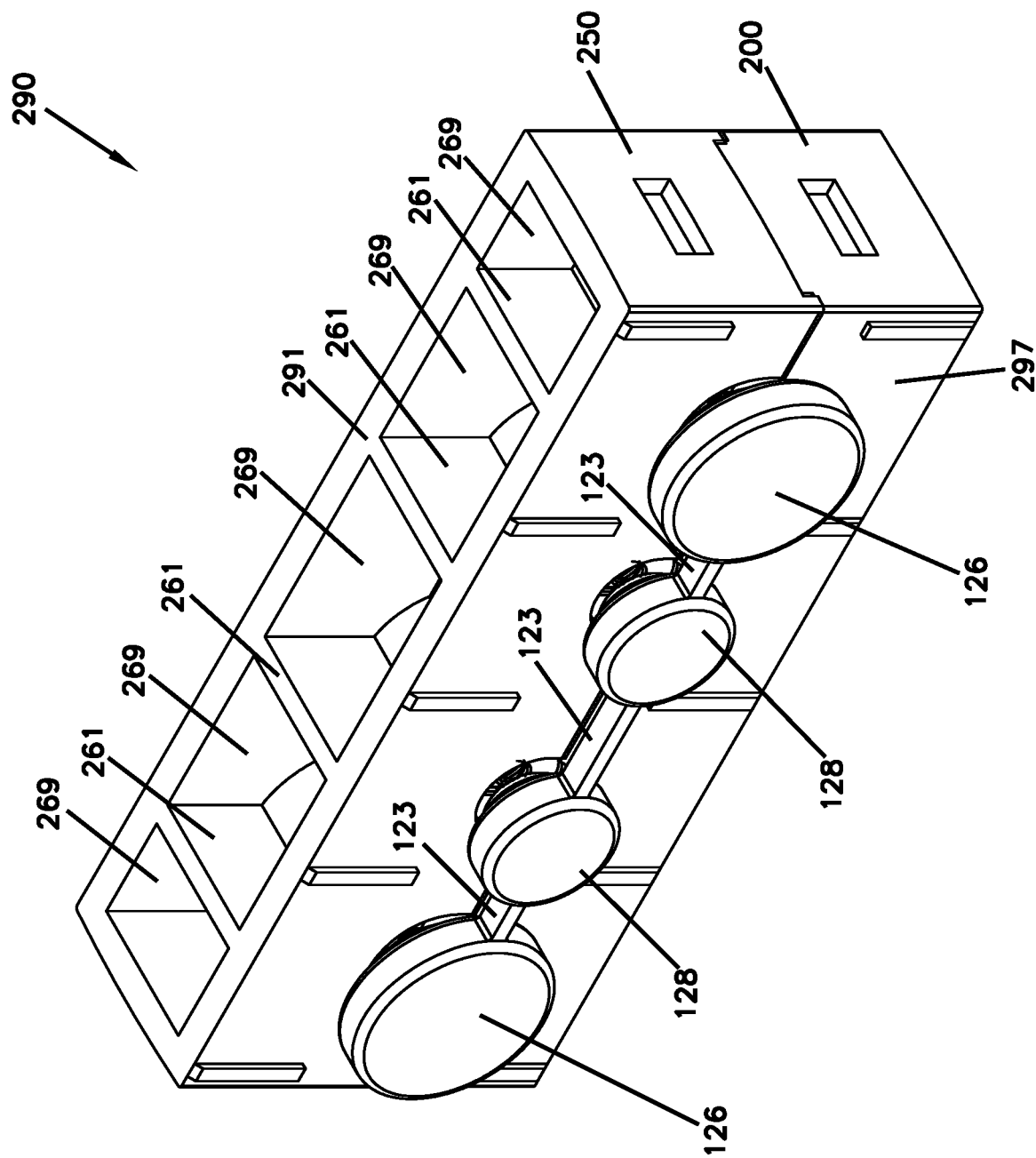
FIG. 13 is a front, top perspective view of the sealing component of FIG. 11.
Figure 14:
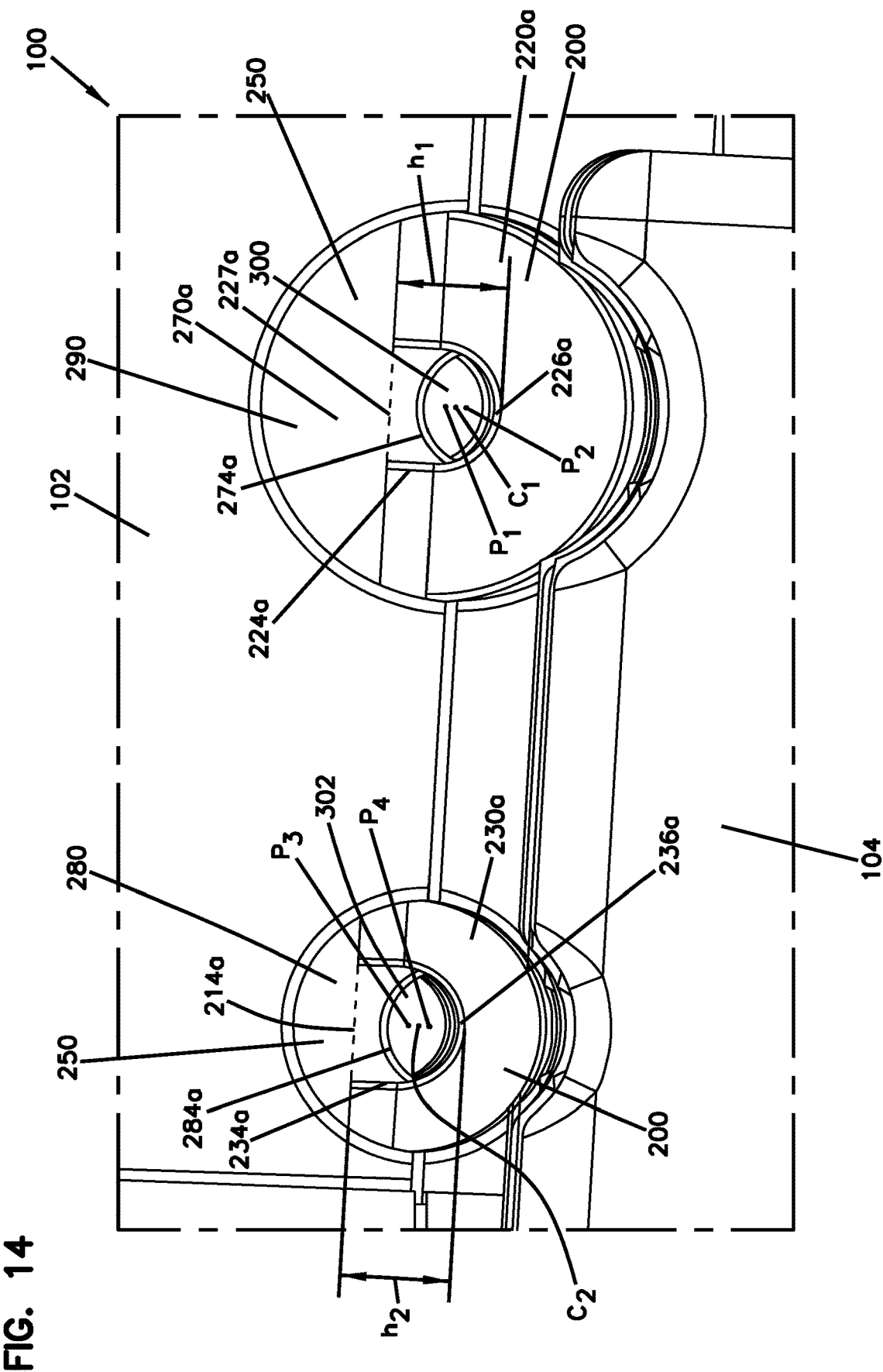
FIG. 14 is a perspective rear view of a portion of the enclosure of FIG. 1, the enclosure being in a closed configuration, and showing a portion of the cable sealing component of FIG. 11 installed therein.

FIG. 11 is a rear view of a cable sealing component 290 in accordance the present disclosure. FIG. 12 is a rear, bottom perspective view of the cable sealing component 290 of FIG. 11. FIG. 13 is a front, top perspective view of the cable sealing component 290 of FIG. 11. FIG. 14 is a perspective rear view of a portion of the enclosure 100 of FIG. 1, the enclosure being in a closed configuration, and showing a portion of the cable sealing component 290 of FIG. 11.

Referring to FIGS. 12 and 13, the cable sealing component 290 includes the sealing blocks 200 and 250. The cable sealing component has a top 291 corresponding to the top of the sealing block 250 and a bottom 293 corresponding to the bottom of the sealing block 200. At the rear 295 of the cable sealing component 290, cables pass through rear ports 292 and 294, which are sized according to the cable size or range of cable sizes to be received by the corresponding channels. In this example, the cable sealing component is shown with the optional removable plugs 126 and 128, which are connected by connectors 123, as discussed above. Optionally, the cable sealing component 290 does not include the plugs 126 and 128. Referring to FIG. 13, the sealing block 250 includes the feet 261 extending upward from the partial channels (252, 254), the feet 261 forming hollow chambers 269. Similarly, referring to FIG. 12, the sealing block 200 includes feet 211 extending downward from the partial channels (202, 204), the feet 211 forming hollow chambers 219.

Referring now to FIGS. 10 and 14, the enclosure 100 includes the first housing component 102, the second housing component 104, the first sealing block 200, and the second sealing block 250, as discussed above. In addition, the ribs 220a with notches 224a at the first end of the first partial channels 202 are showing, and the ribs 230a with notches 234a at the first end of the second partial channels 204 are showing.

As will be described in more detail below, when the enclosure 100 is in the closed configuration, the ribs forming the partial channels in the second sealing block 250 nest in the grooves between the ribs in the corresponding partial channels in the first sealing block 200 to form complete channels. As shown in FIGS. 10 and 14, complete channels 300 are formed by intermeshing the partial channels 202 of the first sealing block 200 with the corresponding partial channels 252 of the second sealing block 250. Likewise, complete channels 302 are formed by intermeshing the partial channels 204 of the first sealing block 200 with the corresponding partial channels 254 of the second sealing block 250.

Still with reference to FIGS. 10 and 14, a center $C_1$ of each of the first complete channels 300 lies on a longitudinal axis (into the page) through the center of each first complete channel 300. In addition, a center $C_2$ of each second complete channel 302 lies on a longitudinal axis (into the page) through the center of each of the second complete channels 302. The height of the notch 224a is defined as $h_1$ and the center of the notch 224a is defined as $P_1$, which is halfway between the bottom 226h of the notch 224h and the top 227h directly thereabove. Likewise, the height of the notch 234a is defined as $h_2$ and the center of the notch 234a is defined as $P_3$, which is halfway between the bottom 236a of the notch 234a and the top 237a directly thereabove. The centers of the notches of the ribs of the first sealing block 200 align with longitudinal axes going into the page passing through $P_1$ in the complete channels 300, and passing through $P_3$ in the complete channels 302. The centers of the notches of the corresponding ribs of the second sealing block 250 align with longitudinal axes going into the page passing through $P_2$ in the complete channels 300, and passing through $P_4$ in the complete channels 302.

As shown in FIG. 14, $P_1$ and $P_2$ (and their corresponding axes going through the centers of the notches) are offset from each other, and each of $P_1$ and $P_2$ is offset from $C_1$. Similarly, $P_3$ and $P_4$ (and their corresponding axes going through the centers of the notches) are offset from each other, and each of $P_3$ and $P_4$ is offset from $C_2$. Thus, the cooperation of the ribs of one of the sealing blocks with the grooves of the other of the sealing blocks results in complete channels 300, 302 that are squashed in one dimension, which can effect better sealing characteristics for a cable passing through such a complete channel (300, 302). The squashed dimension corresponds to the dimension of the sealing blocks along which the sealing blocks are brought together to form the cable sealing component 290. In the example shown, the squashed dimension corresponds to the "vertical dimension," that is, vertical with reference to what have been identified as the "top" and "bottom" of the enclosure 100. Thus, the axes $P_2$ and $P_4$ of the notches of the upper sealing block 250 are below the central axis of the complete channels 300, 302, while the axes $P_1$ and $P_3$ of the notches of the lower sealing block 200 are above the central axis of the complete channels 300, 302.

Figure 15:
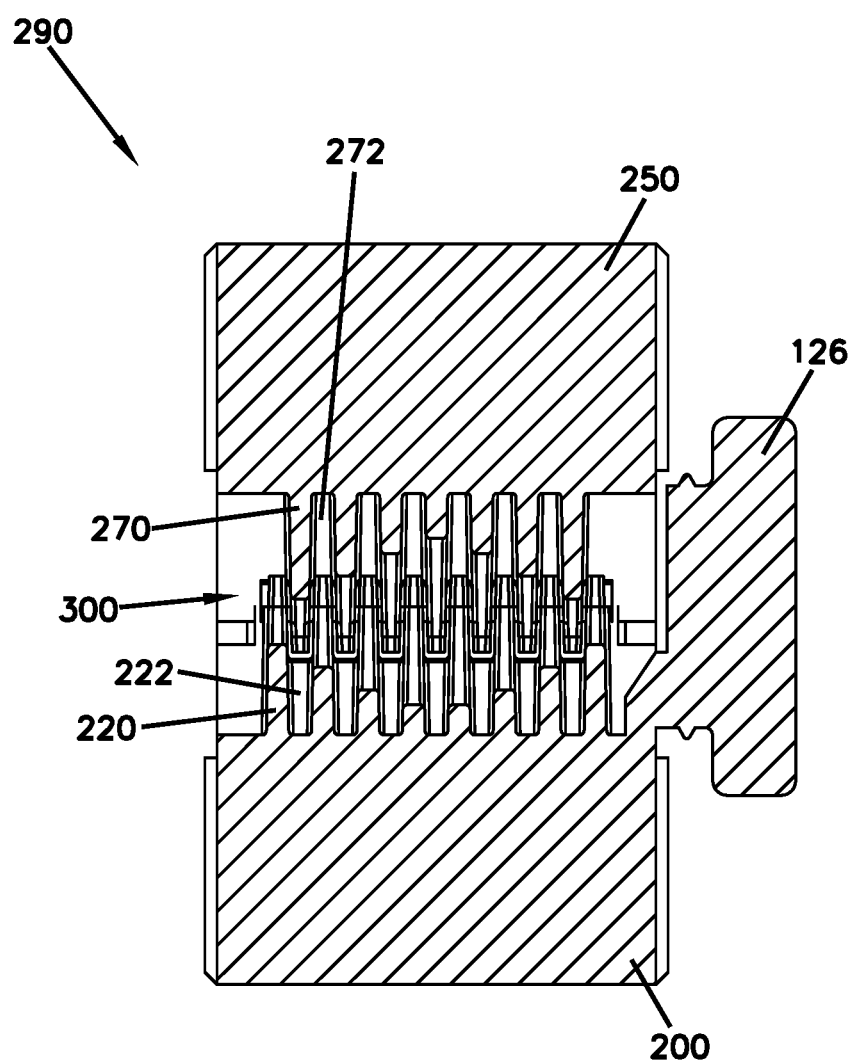
FIG. 15 is a cross-sectional view of the sealing component of FIG. 11 along the line A-A of FIG. 11.
Figure 16:
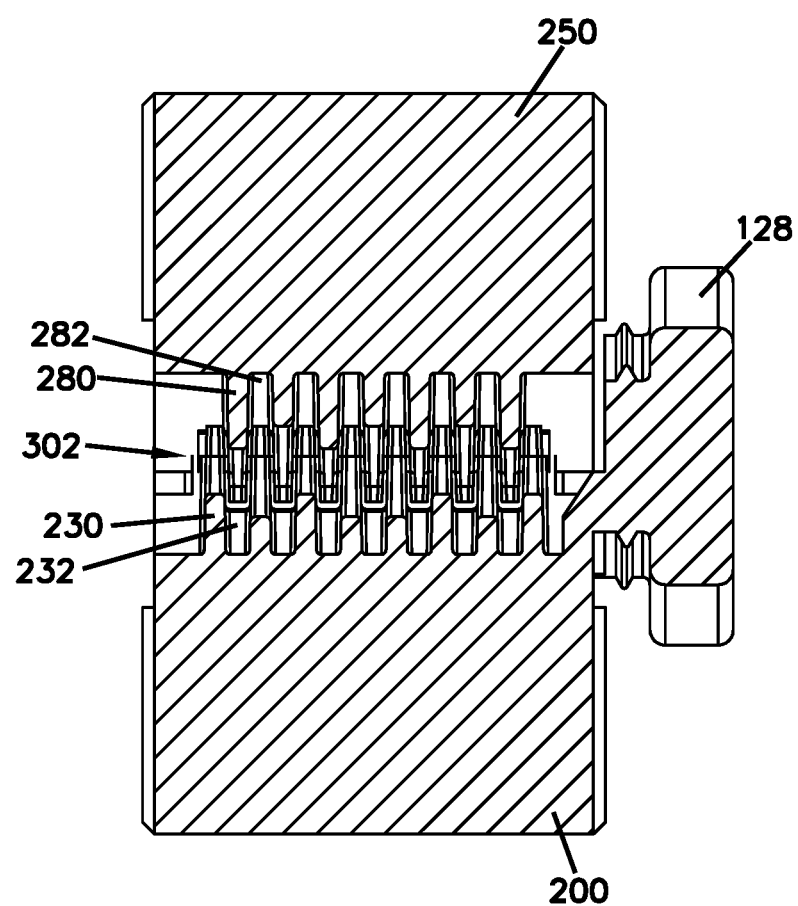
FIG. 16 is a cross-sectional view of the sealing component of FIG. 11 along the line B-B of FIG. 11.
Figure 17:
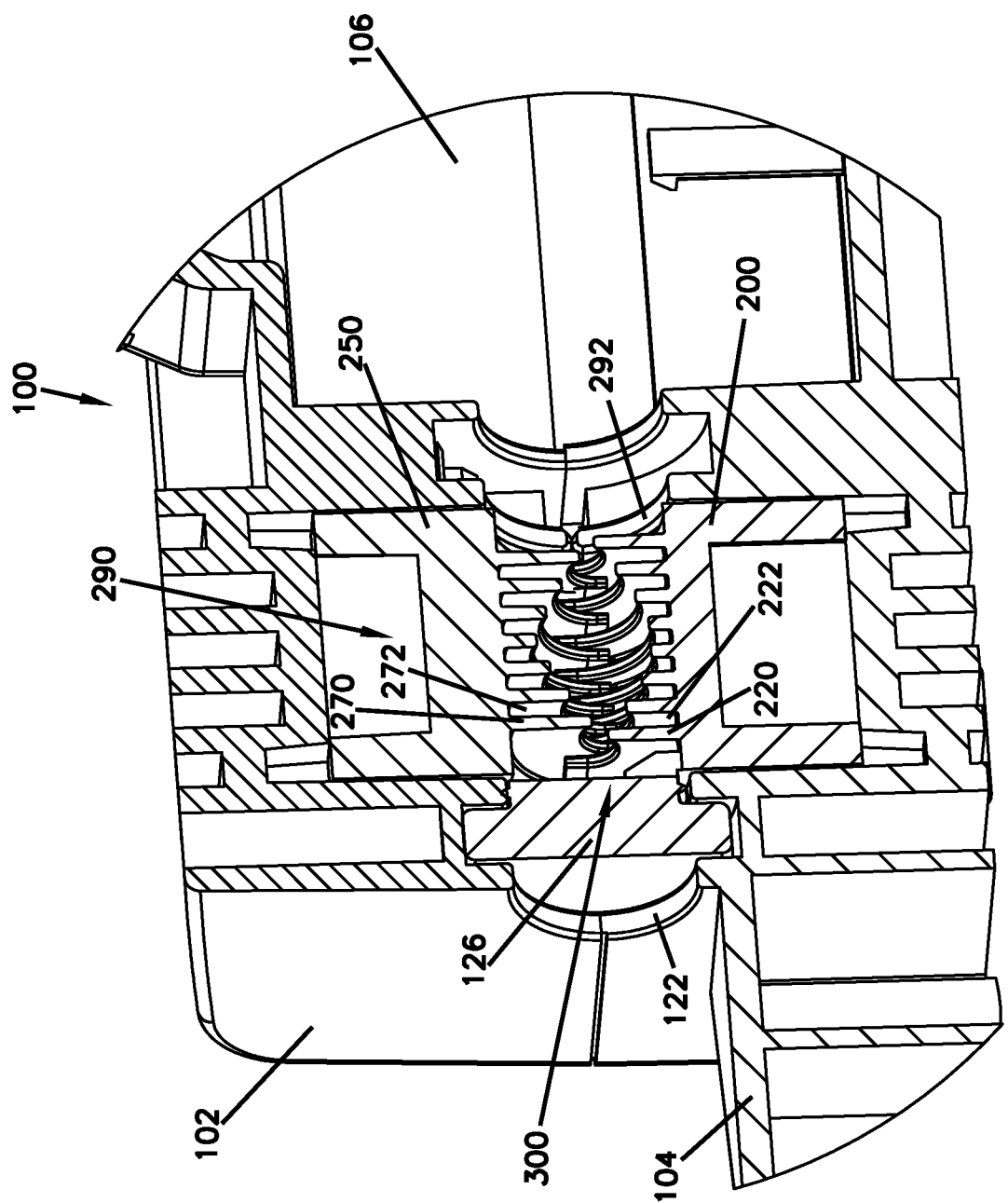
FIG. 17 is a perspective cross-sectional partial view of the sealing component of FIG. 11 installed in the enclosure of FIG. 1.

FIG. 15 is a cross-sectional view of the cable sealing component 290 of FIG. 11 along the line A-A of FIG. 11. FIG. 16 is a cross-sectional view of the cable sealing component 290 of FIG. 11 along the line B-B of FIG. 11. FIG. 17 is a perspective cross-sectional view of the cable sealing component 290 of FIG. 11 installed in the enclosure 100 of FIG. 1, the cross-section being taken through a complete channel 300 as described above.

FIGS. 15 and 17 illustrate a labyrinth-type seal formed by the intermeshing of the ribs and grooves of the sealing blocks 200 and 250 at a complete channel 300. FIG. 16 illustrates the labyrinth-type seal formed by the intermeshing of the ribs and grooves of the sealing blocks 200 and 250 at a complete channel 302. Referring to FIGS. 15-17, for each channel (300, 302) the N-1 ribs (270, 280) of the sealing block 200 occupy the N-1 grooves (222, 232) of the sealing block 200; and the N ribs (sets 220, 230) of the sealing block 200 occupy the N grooves (272, 282) of the sealing block 250, forming a labyrinth type seal.

According to a first example embodiment of the present disclosure is provided a cable sealing component for an enclosure comprising: a pair of elastomeric sealing blocks disposed within the enclosure and operable between a sealing configuration and an open configuration; and two pairs of rib sets, a first rib set of each of the two pairs of rib sets being integral with a first of the pair of elastomeric sealing blocks, a second rib set of each of the two pairs of rib sets being integral with a second of the pair of elastomeric sealing blocks, each of the rib sets of the each of the two pairs of rib sets comprising a plurality of flexible ribs having flexed and non-flexed positions, and a plurality of grooves, wherein when the elastomeric sealing blocks are in the sealing configuration and the ribs are the in the non-flexed position the ribs of the first rib set of a first of the two pairs of rib sets at least partially align with the grooves of a second rib set of the first of the two pairs of rib sets, the ribs of the second rib set of the first of the two pairs of rib sets at least partially align with the grooves of the first rib set of the of first of the two pairs of rib sets, the ribs of the first rib set of a second of the two pairs of rib sets at least partially align with the grooves of a second rib set of the second of the two pairs of rib sets, and the ribs of the second rib set of the second of the two pairs of rib sets at least partially align with the grooves of the first rib set of the second of the two pairs of rib sets.

According to a second embodiment is provided the cable sealing component of the first embodiment, wherein for each of the two pairs of rib sets, the first rib set has N ribs and N-1 grooves the second rib set has N-1 ribs and N grooves.

According to a third embodiment is provided the cable sealing component of the first embodiment, wherein each of the ribs comprises a notch, and wherein for each of the rib sets of each of the two pairs of rib sets, the notches define a partial channel for receiving a cable.

According to a fourth embodiment is provided the cable sealing component of the third embodiment, wherein at least two of the notches in each of the rib sets in each of the pairs of rib sets have different sizes.

According to a fifth embodiment is provided the cable sealing component of the third embodiment, wherein each of the rib sets of the first and second pairs of rib sets has a first end and a second end opposite the first end, wherein the first end and the second end of the first rib set of each of the first and second pairs of rib sets are located at ribs, and wherein the first end and the second end of the second rib set of each of the first and second pairs of rib sets are located at grooves.

According to a sixth embodiment is provided the cable sealing component of the third embodiment, wherein each of the notches has a maximum width, wherein for each of the rib sets of the first pair of rib sets, the maximum width of the notches alternatingly increases and decreases from the first end to the second end, and wherein for each of the rib sets of the second pair of rib sets the maximum width of the notches generally increases from the first end to a midpoint equidistant between the first end and the second end and generally decreases from the midpoint to the second end.

According to a seventh embodiment is provided the cable sealing component of the first embodiment, wherein each of the notches has a center, and wherein when the elastomeric sealing blocks are in the sealing configuration a first line through the centers of the notches of the first rib set of each of the two pairs of rib sets is offset from a second line through the centers of the notches of the second rib set of each of the two pairs of rib sets.

According to an eighth embodiment is provided the cable sealing component of the seventh embodiment, wherein for each of the two pairs of rib sets, the first rib set is integral with a lower of the elastomeric sealing blocks, the second rib set is integral with an upper of the elastomeric sealing blocks, and wherein when the upper and lower elastomeric sealing blocks are in the sealing configuration, the first line is above the second line.

According to a ninth embodiment is provided a telecommunications enclosure comprising: a first housing piece comprising a first mounting location; a second housing piece comprising a second mounting location, the first and second housing pieces being operable between an open configuration and a closed configuration, the first and second housing pieces defining an interior volume; at least one cable port in communication with the interior volume and an environment exterior to the enclosure; and a cable sealing component configured to receive a cable passing through the at least one cable port, the cable sealing component comprising a pair of elastomeric sealing blocks, a first of the elastomeric sealing blocks being removably mounted to the first mounting location, a second of the elastomeric sealing blocks being removably mounted to the second mounting location; and a pair of rib sets, a first rib set of the pair of rib sets being integral with a first of the pair of elastomeric sealing blocks, a second rib set of the pair of rib sets being integral with a second of the pair of elastomeric sealing blocks, each of the rib sets of the pair of rib sets comprising a plurality of flexible ribs having flexed and non-flexed positions, and a plurality of grooves, the ribs of the first rib set of the pair of rib sets at least partially aligning with the grooves of the second rib set of the pair of rib sets and the ribs of the second rib set of the pair of rib sets at least partially aligning with the grooves of the first rib set of the pair of rib sets when the enclosure is in the closed configuration and the ribs are in the non-flexed position.

According to a 10$^{th}$ embodiment is provided the telecommunications enclosure of the ninth embodiment, wherein each of the ribs comprises a notch, and wherein the notches of each of the rib sets defines a partial channel for receiving a cable.

According to an 11$^{th}$ embodiment is provided the telecommunications enclosure of the 10$^{th}$ embodiment, wherein at least two of the notches in each of the rib sets have different sizes.

According to a 12$^{th}$ embodiment is provided the telecommunications enclosure of the 10$^{th}$ embodiment, wherein each of the rib sets has a first end and a second end opposite the first end, wherein the first end and the second end of the first rib set are located at ribs, and wherein the first end and the second end of the second rib set are located at grooves.

According to a 13$^{th}$ embodiment is provided the telecommunications enclosure of the 12$^{th}$ embodiment, wherein each of the notches has a maximum width, and wherein for each of the rib sets the maximum width of the notches alternatingly increases and decreases from the first end to the second end.

According to a 14$^{th}$ embodiment is provided the telecommunications enclosure of the 12$^{th}$ embodiment, wherein each of the notches has a maximum width, and wherein for each of the rib sets the maximum width of the notches generally increases from the first end to a midpoint equidistant between the first end and the second end and generally decreases from the midpoint to the second end.

According to a 15$^{th}$ embodiment is provided the telecommunications enclosure of the 10$^{th}$ embodiment, wherein each of the notches has a center, and wherein when the enclosure is in the closed configuration a first line through the centers of the notches of the first rib set is offset from a second line through the centers of the notches of the second rib set.

According to a 16$^{th}$ embodiment is provided the telecommunications enclosure of the 15$^{th}$ embodiment, wherein the first rib set is integral with a lower of the elastomeric sealing blocks, wherein the second rib set is integral with an upper of the elastomeric sealing blocks, and wherein when the enclosure is the closed configuration, the first line is above the second line.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A cable sealing component for an enclosure comprising:
   a pair of elastomeric sealing blocks disposed within the enclosure and operable between a sealing configuration and an open configuration; and
   a first pair of rib sets, a first rib set of the first pair of rib sets being integral with a first of the pair of elastomeric sealing blocks, a second rib set of the first pair of rib sets being integral with a second of the pair of elastomeric sealing blocks, each of the rib sets of the first pair of rib sets comprising a plurality of flexible ribs having flexed and non-flexed positions, and a plurality of grooves, the ribs of the first rib set of the first pair of rib sets occupying the grooves of the second rib set of the first pair of rib sets and the ribs of the second rib set of the first pair of rib sets occupying the grooves of the first rib set of the first pair of rib sets when the elastomeric sealing blocks are in the sealing configuration and the ribs are in the non-flexed position;
   wherein each of the ribs comprises a notch,
   wherein each of the notches has a center, and
   wherein when the elastomeric sealing blocks are in the sealing configuration, a first reference line through the centers of the notches of the first rib set of the first pair of rib sets is offset from a second reference line through the centers of the notches of the second rib set of the first pair of rib sets;
   wherein the first of the pair of elastomeric sealing blocks is a lower elastomeric sealing block, wherein the second of the pair of elastomeric sealing blocks is an upper elastomeric sealing block, wherein the first rib set of the first pair of rib sets is integral with the lower elastomeric sealing block, wherein the second rib set of the first pair of rib sets is integral with the upper elastomeric sealing block, and wherein when the upper and lower elastomeric sealing blocks are in the sealing configuration, the first reference line is above the second reference line.

2. The cable sealing component as in claim 1, wherein the first rib set of the first pair of rib sets has N ribs and N-1 grooves, and wherein the second rib set of the first pair of rib set has N-1 ribs and N grooves.

3. The cable sealing component as in claim 1, wherein the notches of each of the first pair of rib sets defines a partial channel for receiving a cable.

4. The cable sealing component as in claim 3, wherein at least two of the notches in each of the rib sets in the first pair of rib sets have different sizes.

5. The cable sealing component as in claim 3, wherein each of the rib sets of the first pair of rib sets has a first end and a second end opposite the first end, wherein the first end and the second end of the first rib set of the first pair of rib sets are located at ribs, and wherein the first end and the second end of the second rib set of the first pair of rib sets are located at grooves.

6. The cable sealing component as in claim 5, wherein each of the notches has a maximum width, and wherein for each of the rib sets the maximum width of the notches alternatingly increases and decreases from the first end to the second end.

7. The cable sealing component as in claim 5, wherein each of the notches has a maximum width, and wherein for each of the rib sets the maximum width of the notches generally increases from the first end to a midpoint equidistant between the first end and the second end and generally decreases from the midpoint to the second end.

8. The cable sealing component as in claim 3, wherein when the elastomeric sealing blocks are in the sealing configuration the partial channels of the first and second rib sets of the first pair of rib sets form a complete channel for receiving and sealing a cable within the complete channel.

9. The cable sealing component as in claim 3, wherein when the elastomeric sealing blocks are in the sealing configuration the ribs of the first and second rib sets intermesh to form a labyrinth-type seal about a cable.

10. The cable sealing component as in claim 1, further comprising a second pair of rib sets, a first rib set of the second pair of rib sets being integral with the first of the pair of elastomeric sealing blocks, a second rib set of the second pair of rib sets being integral with the second of the pair of elastomeric sealing blocks, each of the rib sets of the second pair of rib sets comprising a plurality of flexible ribs having flexed and non-flexed positions and a plurality of grooves, the ribs of the first rib set of the second pair of rib sets occupying the grooves of the second rib set of the second pair of rib sets and the ribs of the second rib set of the second pair of rib sets occupying the grooves of the first rib set of the second pair of rib sets when the elastomeric sealing blocks are in the sealing configuration and the ribs are in the non-flexed position.

11. The cable sealing component as in claim 10, wherein each rib of the second pair of rib sets comprises a notch, wherein the notches of each of the second pair of rib sets defines a partial channel for receiving a cable, wherein each of the rib sets of the second pair of rib sets has a first end and a second end opposite the first end, wherein each of the notches of the second pair of rib sets has a maximum width, and wherein for each of the rib sets of the second pair of rib sets the maximum width of the notches alternatingly increases and decreases from the first end to the second end.

12. The cable sealing component as in claim 10, wherein each rib of the second pair of rib sets comprises a notch, wherein the notches of each of the second pair of rib sets defines a partial channel for receiving a cable, wherein each of the rib sets of the second pair of rib sets has a first end and a second end opposite the first end, wherein each of the notches of the second pair of rib sets has a maximum width, and wherein for each of the rib sets of the second pair of rib sets the maximum width of the notches generally increases from the first end to a midpoint equidistant between the first end and the second end and generally decreases from the midpoint to the second end.

13. The cable sealing component as in claim 1, wherein the sealing component is configured to form a seal at at least an IP 65 rating.

14. The cable sealing component as in claim 1, wherein when the elastomeric sealing blocks are in the sealing configuration a first side of the cable sealing component comprises a first port in communication with the environment exterior to the enclosure and a second side of the sealing component opposite the first side comprises a second port opposite the first port, the second port being in communication with an interior of the enclosure.

15. The cable sealing component as in claim 14, wherein the first port is removably pluggable with an elastomeric plug.

* * * * *